(12) United States Patent
Zelicovich

(10) Patent No.: US 12,545,493 B2
(45) Date of Patent: Feb. 10, 2026

(54) AEROSOL DELIVERY SYSTEM WITH ENHANCED AIR SUSPENSION

(71) Applicant: Marcelo Lazaro Zelicovich, Miami, FL (US)

(72) Inventor: Marcelo Lazaro Zelicovich, Miami, FL (US)

( * ) Notice: Subject to any disclaimer, the term of this patent is extended or adjusted under 35 U.S.C. 154(b) by 0 days.

(21) Appl. No.: 19/061,649

(22) Filed: Feb. 24, 2025

(65) Prior Publication Data

US 2025/0270026 A1     Aug. 28, 2025

Related U.S. Application Data

(60) Provisional application No. 63/557,353, filed on Feb. 23, 2024.

(51) Int. Cl.
*B65D 83/14*     (2025.01)
*C09K 3/30*     (2006.01)

(52) U.S. Cl.
CPC ............... *B65D 83/14* (2013.01); *C09K 3/30* (2013.01)

(58) Field of Classification Search
CPC .................................. B65D 83/14; C09K 3/30
See application file for complete search history.

(56) References Cited

U.S. PATENT DOCUMENTS

| | | |
|---|---|---|
| 8,544,696 B2 | 10/2013 | Willemsen et al. |
| 8,734,671 B2 | 5/2014 | Hulse et al. |
| 8,961,812 B2 | 2/2015 | Minor et al. |
| 9,499,729 B2 | 11/2016 | Hoye et al. |
| 10,435,342 B2 | 10/2019 | Singh et al. |
| 10,640,284 B2 | 5/2020 | Franckhauser et al. |
| 10,836,562 B2 | 11/2020 | Magness et al. |
| 10,960,129 B2 | 3/2021 | Hill |

(Continued)

FOREIGN PATENT DOCUMENTS

| | | |
|---|---|---|
| JP | 2019202949 A | 11/2019 |
| JP | 7568438 B2 | 10/2024 |

(Continued)

OTHER PUBLICATIONS

Scognamiglio et al. (Fragrance material review on cis-jasmone, Food and Chemical Toxicology 50 (2012) S613-S618). (Year: 2012).*

(Continued)

*Primary Examiner* — Ariana Zimbouski
(74) *Attorney, Agent, or Firm* — Derek Fahey, Esq.; The Plus IP Firm, PLLC

(57) ABSTRACT

An aerosol delivery system is disclosed. The system comprises an aerosol container housing an aerosol composition that includes a propellant mixture and an additive. The propellant mixture comprises a first hydrofluoroolefin propellant in an amount of 50% to 99% w/w % and a second hydrofluoroolefin propellant in an amount of 1% to 50% w/w %. The additive is present in an amount of up to 70% w/w %, has a specific gravity of 0.5 to 1.2, a partition coefficient of −0.5 to 4, and a water content of up to 2% w/w %. A micromist actuator with an orifice diameter of 0.25 to 0.80 microns produces droplets of 25 to 50 microns. The aerosol has a viscosity of 0.5 to 3.0 centipoise, ensuring fine mist dispersion, prolonged airborne suspension, and consistent delivery, making it suitable for environmental scenting, air treatment, and personal care applications.

8 Claims, 7 Drawing Sheets

(56) References Cited

U.S. PATENT DOCUMENTS

| | | |
|---|---|---|
| 11,186,424 B2 | 11/2021 | Swaile et al. |
| 11,352,196 B2 | 6/2022 | Mosler et al. |
| 11,384,319 B2 | 7/2022 | Ito |
| 11,702,379 B2 | 7/2023 | Peng et al. |
| 11,760,910 B2 | 9/2023 | Hayamizu et al. |
| 11,905,104 B2 | 2/2024 | Cassoni et al. |
| 2006/0014486 A1 | 1/2006 | Perrin |
| 2008/0006719 A1* | 1/2008 | Clerget ............ B05B 1/14 239/533.13 |
| 2012/0043492 A1 | 2/2012 | Williams et al. |
| 2012/0128964 A1* | 5/2012 | Hulse ............ C09K 5/045 428/305.5 |
| 2017/0005079 A1 | 1/2017 | Hoeppel et al. |
| 2019/0307298 A1 | 10/2019 | Zhao et al. |
| 2020/0039732 A1 | 2/2020 | Ditto et al. |
| 2022/0396724 A1 | 12/2022 | Carpenter et al. |
| 2023/0026203 A1 | 1/2023 | Joshi et al. |
| 2024/0043777 A1 | 2/2024 | Osafune et al. |
| 2024/0216275 A1 | 7/2024 | Cocks et al. |

FOREIGN PATENT DOCUMENTS

| | | |
|---|---|---|
| KR | 20130116293 A | 10/2013 |
| RU | 2544689 C2 | 3/2015 |
| WO | 2023/097333 A1 | 6/2023 |

OTHER PUBLICATIONS

General Information for jasmone (https://sitem.herts.ac.uk/aeru/bpdb/Reports/1382.htm, published May 3, 2016, accessed Jun. 12, 2025). (Year: 2016).*

Starns (Top 7 Jasmine Essential Oil Uses and Benefits, Vine Vida, published Feb. 8, 2023, accessed Jun. 12, 2025, https://www.vinevida.com/blogs/our-blog/jasmine-essential-oil-benefits#:~:text=Jasmine%20essential%20oil%20is%20so,We%20hope%20you%20do%20too.) (Year: 2023).*

* cited by examiner

AEROSOL DELIVERY SYSTEM WITH ENHANCED AIR SUSPENSION

REFERENCE TO RELATED APPLICATIONS

This application is a non-provisional patent application that claims the benefit of U.S. Provisional Appl. No. 63/557,353, titled "METHODS AND SYSTEMS FOR OPTIMIZING ADDITIVE DISPERSION LEVERAGING SPECIFIC GRAVITY AND PROPELLANT COMPATIBILITY", and filed on 23 Feb. 2024, the subject matter of which is hereby incorporated by reference.

CROSS-REFERENCES

Not Applicable.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISK

Not Applicable.

TECHNICAL FIELD

The present disclosure relates to the field of aerosol delivery systems, and more specifically to the field of formulations and dispensing mechanisms for fine mist aerosols used in applications such as air freshening, environmental scenting, topical cooling, and surface treatments.

BACKGROUND OF THE INVENTION

Aerosol spray technology has been widely utilized across various industries, including medical applications, personal care, and industrial formulations. However, existing aerosol technologies suffer from various limitations depending on their intended use. Many prior art systems focus on delivering high-volume liquid applications, rapid cooling effects through phase-change evaporation, or simple aerosol dispersion without optimizing for microdroplet control, sustained airborne presence, or controlled sensory effects. These shortcomings hinder their adaptability for applications that require precise misting, prolonged diffusion, and even skin coverage.

For example, U.S. Pat. No. 10,960,129 B2 describes a medical irrigation system designed to deliver a sterilizing fluid to a patient's skin. The system utilizes a dual-chamber fluid mechanism to mix components prior to application, ensuring effective wound cleansing and sterilization. However, this system is optimized for medical treatment rather than a controlled misting effect. The high-volume liquid application does not allow for fine, even dispersion, which is necessary for applications requiring a gentle mist rather than direct fluid contact. Furthermore, this reference does not discuss the control of microdroplet formation, fragrance diffusion, or sensory effects, making it unsuitable for use cases that require a prolonged, airborne misting function.

Similarly, U.S. Pat. No. 11,352,196 B2 discloses a vapocoolant spray system designed to provide rapid temperature reduction for pain relief. This system employs a high-pressure propellant to generate an immediate cooling effect on the skin, relying on the rapid evaporation of volatile compounds. However, vapocoolant sprays are designed for medical applications, such as anesthetic cooling, and do not consider factors like uniform microdroplet distribution or prolonged mist retention on the skin. Because vapocoolants evaporate almost instantly, they lack the ability to provide a lingering effect or controlled hydration, making them unsuitable for applications requiring sustained refreshment rather than an immediate temperature drop. Additionally, the reliance on strong chemical reactions for cooling may cause excessive drying of the skin, limiting their comfort and versatility.

Beyond medical applications, some prior art references focus on general aerosol spray systems but fail to optimize their formulations for controlled diffusion or mist retention. U.S. Pat. No. 11,918,549 B2 describes a pressurized aerosol system that can be used for various applications but does not provide specific control over microdroplet size, fragrance diffusion, or sustained airborne presence. Traditional aerosol sprays often function as simple mechanical dispensers, prioritizing broad spray coverage over precision misting. The lack of microdroplet optimization leads to rapid dissipation of the spray, reducing its effectiveness in applications requiring prolonged exposure or controlled misting on the skin. Additionally, such systems do not account for the need to balance mist longevity with uniform coverage, which is critical in applications that involve both sensory effects and controlled diffusion.

WO 2023/097333 A1 describes the use of hydrofluoroolefin (HFO) propellants in aerosol sprays, focusing primarily on the efficiency and safety of these propellants. While HFO propellants are an improvement over traditional hydrocarbon-based aerosols in terms of environmental impact, this reference does not explore how propellant selection affects microdroplet formation, sustained airborne presence, or controlled misting effects. Without an emphasis on microdroplet engineering, this prior art is limited in its ability to address applications that require precision in spray diffusion and sensory coverage.

Likewise, Japanese Patent No. 7568438 B2 discloses a hairspray formulation utilizing HFO-based propellants but is specifically optimized for styling hold rather than fragrance diffusion or sensory effects. Hairsprays are designed to deposit polymers onto the hair to maintain a particular style, which fundamentally differs from applications that require prolonged airborne diffusion or controlled skin refreshment. The focus on styling polymers limits the ability of such formulations to function effectively in applications where mist longevity, fragrance retention, or skin coverage is required. Furthermore, hairsprays typically contain agents that may cause stickiness or discomfort when applied outside their intended use, making them unsuitable for applications needing a light, refreshing mist.

Additional prior art references further highlight the limitations of existing spray technologies. U.S. Patent Application No. 2006/0144864 A1 describes a medical spray delivery system designed for precise liquid administration of pharmaceutical or anesthetic agents. While this system provides controlled dosing, it is limited to clinical applications and does not account for airborne fragrance retention or sensory cooling effects. Similarly, U.S. Patent Application No. 2014/0070129 A1 discloses a spray cooling system designed for medical and industrial applications, utilizing aerosol-based cooling agents for rapid temperature reduction. However, it does not address microdroplet engineering for controlled, long-lasting misting effects, making it unsuitable for applications requiring a prolonged sensory experience rather than extreme temperature drops.

Furthermore, U.S. Patent Application No. 2017/0050795 A1 describes a pressurized liquid dispenser optimized for industrial and medical use. This system focuses on metered fluid release but does not incorporate airborne retention, sensory effects, or microdroplet control for enhanced user experience. Similarly, U.S. Patent Application No. 2017/0354807 A1 discloses a vapocoolant dispenser designed for anesthetic skin cooling. Vapocoolants use high-pressure release mechanisms to achieve an immediate temperature drop but fail to provide a sustained, gentle misting effect. Because vapocoolants rely on abrupt phase changes and rapid evaporation, they do not address the need for fine droplet dispersion, prolonged skin contact, or fragrance diffusion.

Despite these developments, the prior art fails to adequately address several challenges in aerosol delivery systems. Many existing formulations use single-component HFO propellants or broad mixtures without a precise balance that optimizes performance. Additionally, prior compositions are often tailored for specific applications, such as cosmetics or refrigerants, limiting their versatility. Furthermore, while some references discuss environmentally friendly propellants, they do not provide a comprehensive approach that balances environmental impact with spray efficacy, stability, and formulation compatibility. Additionally, many prior art systems do not sufficiently optimize the ratio of multiple HFO propellants to control key factors such as evaporation rate, droplet dispersion, and aerosol efficiency.

Across these various prior art references, a common shortcoming is the lack of precise microdroplet control, sustained mist presence, and uniform dispersion. Whether in medical applications, anesthetic cooling, generic aerosol spray systems, or hair styling formulations, these technologies are designed for specific functions that do not prioritize mist longevity, fragrance diffusion, or controlled refreshment. The failure to optimize droplet size and dispersion mechanics limits their effectiveness in applications that require a fine mist with prolonged airborne presence and even skin coverage. These gaps highlight the need for improved aerosol systems that can achieve uniform microdroplet dispersion while ensuring controlled and sustained diffusion in a variety of sensory applications.

Conventional aerosol dispensers operate by utilizing a propellant gas, such as hydrocarbons or compressed air, to expel the contents stored within the canister or container. These contents typically consist of a mixture of liquid or liquefied gas along with the desired substance, ranging from air fresheners to hairsprays. Upon depressing the valve of the aerosol can, the propellant gas expands, generating pressure inside the canister that forces the liquid or liquefied gas out through the nozzle. This pressure forces the liquid or liquefied gas out of the canister through the nozzle, where it atomizes into fine droplets or particles, forming an aerosol spray.

Many conventional aerosol propellants, such as hydrocarbons and chlorofluorocarbons (CFCs), can contribute to air pollution and ozone depletion when released into the atmosphere. CFCs are potent greenhouse gases with high global warming potential (GWP). While they are less abundant in the atmosphere compared to other greenhouse gases like carbon dioxide ($CO_2$), their impact per molecule is much greater. Therefore, CFC emissions contribute to climate change and global warming by trapping heat in the Earth's atmosphere.

Aerosol sprays can negatively affect indoor air quality, especially in poorly ventilated spaces. The particles and chemicals released during spraying can linger in the air, leading to respiratory discomfort, headaches, and other health issues for occupants. A significant portion of the product in conventional aerosol dispensers may be lost as propellant gas. This means that not all of the contents in the canister are effectively dispensed, leading to inefficiencies in product usage.

Additionally, aerosol sprays can release volatile organic compounds (VOCs) into the air, which can contribute to indoor air pollution and have adverse health effects, particularly for individuals with respiratory conditions or sensitivities. In poorly ventilated spaces, VOC concentrations can become elevated, posing greater risks to occupants' health. Some VOCs, such as benzene and formaldehyde, are known to harm vegetation and ecosystems. Additionally, VOCs emitted into the atmosphere can undergo reactions that lead to the formation of particulate matter, which can affect air quality and visibility.

Aerosol delivery systems have been widely used across various industries, including pharmaceuticals, personal care, household products, and industrial applications. These systems typically rely on a pressurized propellant mixture to disperse a liquid or particulate formulation as a fine mist or spray. While conventional aerosol technology has been effective for delivering active ingredients, significant challenges remain in optimizing the suspension time of aerosolized droplets, improving droplet size control, and maintaining a homogeneous formulation without phase separation or degradation over time.

One of the primary challenges in aerosol delivery systems is achieving extended airborne suspension of the dispensed aerosol. Many conventional aerosol formulations produce droplets that rapidly settle due to gravitational forces, limiting their effectiveness in applications where prolonged air suspension is desirable. This is particularly problematic in areas such as air sanitization, deodorization, and surface coating, where prolonged dispersion is necessary for optimal performance. Existing solutions often rely on small particle sizes or increased turbulence to delay settling, but these approaches can be inconsistent and difficult to control.

Another issue in the field relates to the selection of propellants that balance environmental considerations with performance efficiency. Historically, chlorofluorocarbon (CFC) propellants were widely used but have since been phased out due to their harmful impact on the ozone layer. Hydrofluoroalkane (HFA) and hydrofluorocarbon (HFC) propellants have served as alternatives, but concerns about their global warming potential (GWP) have led to regulatory pressures to identify more sustainable options. Hydrofluoroolefin (HFO) propellants have emerged as a promising class of environmentally friendly propellants due to their low GWP and favorable thermodynamic properties. However, optimizing their performance in aerosol systems, particularly in formulations requiring extended airborne suspension, remains a technical challenge.

In addition, maintaining the stability and homogeneity of aerosol formulations presents a further complication. Many aerosol additives, such as fragrances, active agents, and solvents, may have limited solubility or compatibility with certain propellants, leading to phase separation, precipitation, or degradation over time. This instability can compromise product performance, reduce efficacy, and lead to nozzle clogging or inconsistent spray characteristics. Existing stabilizing techniques, such as surfactants or co-solvents, may not always be suitable for all formulations and can introduce additional complexities.

Furthermore, the design of aerosol actuators and valves plays a crucial role in determining spray characteristics, including droplet size, dispersion pattern, and flow rate. Conventional actuators and valves often produce droplets that are too large for applications requiring fine mist dispersion, or they may lack the necessary control to achieve consistent performance. In applications where precise droplet size and extended suspension are critical, there is a need for improved actuator and valve configurations that enhance aerosol delivery efficiency.

As a result, there exists a need for improvements over the prior art and more particularly for a more improved aerosol delivery system that addresses the issues of air suspension, formulation stability, and precise droplet control.

BRIEF SUMMARY OF THE INVENTION

An aerosol delivery system with enhanced air suspension is disclosed. This Summary is provided to introduce a selection of disclosed concepts in a simplified form that are further described below in the Detailed Description including the drawings provided. This Summary is not intended to identify key features or essential features of the claimed subject matter. Nor is this Summary intended to be used to limit the claimed subject matter's scope.

In one embodiment, the system comprises an aerosol container comprising an aerosol. The aerosol comprises a propellant mixture contained within the aerosol container. The propellant mixture comprises a first hydrofluoroolefin propellant present in an amount of 50 percent to 99 percent w/w percent of the propellant mixture. The propellant mixture further comprises a second hydrofluoroolefin propellant present in an amount of 1 percent to 50 percent w/w percent of the propellant mixture. The aerosol further comprises an additive present in an amount up to 70 percent w/w percent of the aerosol. The aerosol delivery system further comprises a micromist actuator coupled to an aerosol valve. The micromist actuator comprises an actuator orifice having an exit diameter ranging from 0.25 microns to 0.80 microns. The aerosol, when dispensed through the micromist actuator, forms droplets having a mean droplet size ranging from 25 microns to 50 microns, as measured by laser diffraction particle size analysis. The first hydrofluoroolefin propellant is trans-1,3,3,3-tetrafluoroprop-1-ene. The second hydrofluoroolefin propellant is trans-1-chloro-3,3,3-trifluoropropene. The additive is an essential oil comprising a specific gravity within a range of 0.5 to 1.2. The additive is an essential oil having a polarity with a partition coefficient present within a range from –0.5 to 4.0. The additive is an essential oil that is molecularly compatible with the propellant mixture, such that the additive comprises a partition coefficient in a range of –0.5 to 4. A viscosity of the aerosol is within a range of 0.5 to 3.0 centipoise at room temperature.

Additional aspects of the disclosed embodiment will be set forth in part in the description which follows, and in part will be obvious from the description, or may be learned by practice of the disclosed embodiments. The aspects of the disclosed embodiments will be realized and attained by means of the elements and combinations particularly pointed out in the appended claims. It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute part of this specification, illustrate embodiments of the disclosure and together with the description, explain the principles of the disclosed embodiments. The embodiments illustrated herein are presently preferred, it being understood, however, that the disclosure is not limited to the precise arrangements and instrumentalities shown, wherein.

Like reference numerals refer to like parts throughout the various views of the drawings.

Figure 1A:
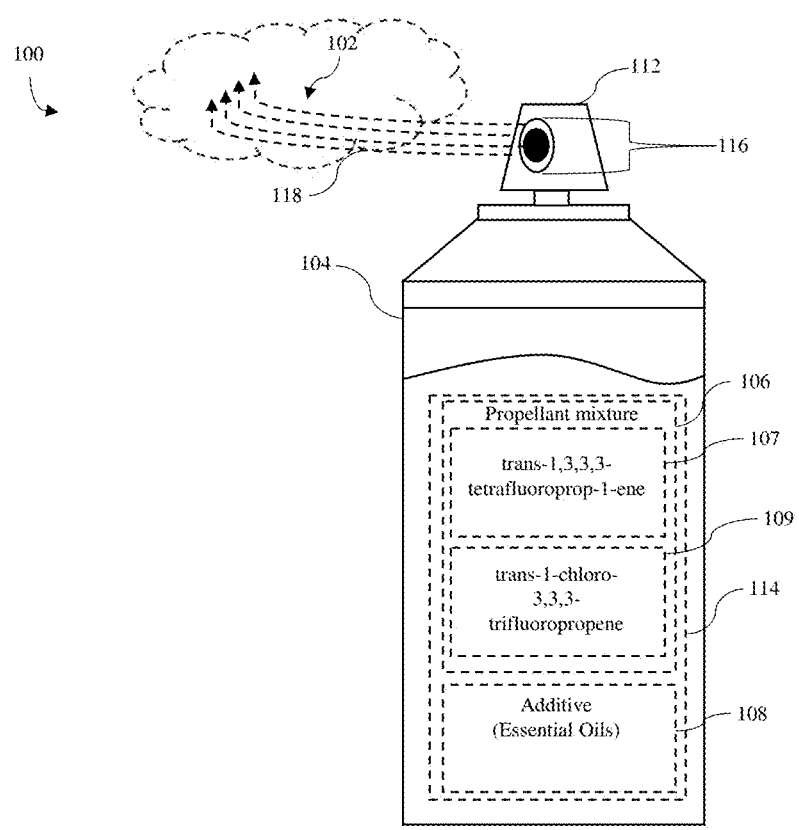
FIGS. 1A and 1B illustrate an aerosol delivery system with enhanced air suspension, according to an example embodiment.

The figures provided herein are not drawn to scale and are presented solely for illustrative purposes to depict exemplary embodiments of the disclosed aerosol delivery system. Variations in dimensions, proportions, and relative positioning of components may exist and are not intended to limit the scope of the invention. The figures serve to facilitate an understanding of the structure, functionality, and possible implementations of the disclosed system but do not represent precise manufacturing specifications. One skilled in the art will recognize that modifications may be made to the depicted embodiments without departing from the spirit and scope of the invention, and such variations are considered to be encompassed within this disclosure.

DETAILED DESCRIPTION

The following detailed description refers to the accompanying drawings. Whenever possible, the same reference numbers are used in the drawings and the following description to refer to the same or similar elements. While disclosed embodiments may be described, modifications, adaptations, and other implementations are possible. For example, substitutions, additions, or modifications may be made to the elements illustrated in the drawings, and the methods described herein may be modified by substituting reordering or adding additional stages or components to the disclosed methods and devices. Accordingly, the following detailed description does not limit the disclosed embodiments. Instead, the proper scope of the disclosed embodiments is defined by the appended claims.

The disclosed embodiments improve upon the problems with the prior art by providing an aerosol solution that provides synergistic effect, attributed to molecular compatibility and specific gravity of the molecules of the aerosol solution with other materials in the aerosol solution. Molecular compatibility ensures a harmonious interaction among the various components of the aerosol solution, providing stability and enhancing the overall effectiveness of the solution. The specific gravity further contributes to the solution's unique characteristics. The aerosol solution has long-lasting properties that ensure that the desired scent persists in the environment for an extended period, enhancing the user experience. Furthermore, the disclosed embodiments provide for greater persistence of nanoparticles that results in longer duration of the aroma of the air freshener and less deposition onto surfaces. The synergistic effect results in an extended lifespan of the aerosol product, promoting longevity and durability in applications. The solution exhibits non-flammability, eliminating potential safety hazards associated with traditional aerosols. Furthermore, the formulation's design leads to the generation of no Volatile Organic Compounds (VOCs), aligning with environmental sustainability goals and minimizing air pollution. The disclosed embodiments improve upon the problems with the prior art by providing environmental friendliness, having no adverse impact on the ozone layer. The molecular compatibility and specific gravity considerations provide a synergistic effect that enhances performance, contributes to an extended lifespan, non-flammability, absence of VOCs, environmental friendliness, and ozone layer preservation.

Further, the disclosed embodiments improve upon the problems with the prior art by providing an aerosol solution that enhances cleanliness and health of users, and minimizes use of harmful chemicals that could impact air quality and human health. Additionally, the disclosed embodiments improve upon the problems with the prior art by incorporating antimicrobial agents or natural disinfectants that enhance cleanliness and mitigate the spread of germs and pathogens. Additionally, in the disclosed embodiments, the aerosol dispensers use solutions that do not contain volatile organic compounds (VOCs) and compounds that harm the ozone layer, thereby enhancing human health and the environment.

The disclosed embodiments improve upon the prior art by providing an additive mixture that is well dispersed and compatible with the propellant mixture in aerosol containers. The additive mixture being effectively dispersed throughout the propellant mixture provides uniform distribution of active ingredients, fragrances, or other desired components within the aerosol solution. This uniform dispersion results in consistent product application and coverage, minimizing wastage and maximizing the utilization of the additive's properties. The compatibility between the additive mixture and the propellant mixture is essential for maintaining product stability and integrity. When the additive components are molecularly compatible with the propellant, they remain suspended in the solution without separation or degradation over time. This ensures product efficacy and longevity, preserving the intended benefits and functionality throughout the product's lifespan. The well-dispersed and compatible additive mixture contributes to the overall user experience by ensuring smooth and reliable aerosol delivery. Consumers can depend on consistent performance and quality with each use, leading to greater satisfaction and trust in the product.

The disclosed aerosol delivery system requires minimal to no shaking prior to dispensing, unlike many conventional aerosol products that rely on agitation to mix separated components before use. This stability is achieved through molecular compatibility between the additive and the propellant mixture, ensuring a homogeneous formulation that remains evenly dispersed within the container. The additive, which may include essential oils, alcohols, ketones, esters, or refined terpenic hydrocarbons, is selected based on its partition coefficient in the range of −0.5 to 4, allowing it to remain fully dissolved or uniformly suspended within the hydrofluoroolefin (HFO) propellant mixture without phase separation, precipitation, or settling over time. Additionally, the controlled viscosity of 0.5 to 3.0 cP at room temperature ensures that the formulation flows consistently through the actuator without requiring agitation to redistribute ingredients. Unlike conventional air fresheners and personal care sprays, which often contain suspended particulates or emulsified ingredients that settle at the bottom of the container, this system maintains a single-phase or stable dispersion, eliminating the need for pre-use shaking. This property ensures instantaneous, reliable actuation with consistent droplet formation and spray characteristics throughout the product's lifecycle, enhancing user convenience and product effectiveness.

Figure 1B:
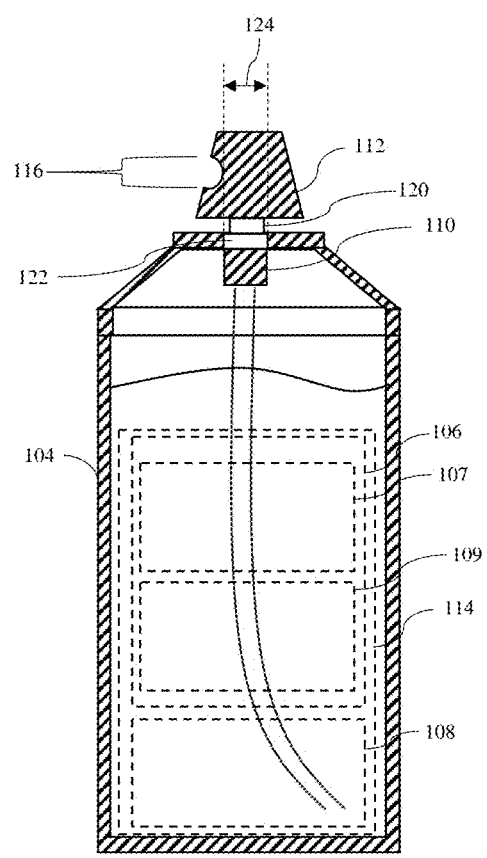

Referring now to the Figures, FIGS. 1A and 1B illustrate the aerosol dispenser 100, in accordance with an embodiment of the invention. The aerosol dispenser 100 efficiently releases an aerosol 102, which is a fine mist or spray of liquid or gas upon activation. The aerosol dispenser includes an aerosol container 104 that is often pressurized for holding the material to be dispensed, a propellant mixture 106, and an additive mixture 108 for storing the aerosol container. The material to be dispensed is configured to be a homogeneously dispersed fluid 114. Ideally, the fluid within the container 104 is a gaseous fluid. The aerosol dispenser further includes an aerosol valve 110, and an aerosol actuator 112, such as a button or a trigger on a top portion of the aerosol dispenser for pressing by a user to release the mist or gas. Aerosol dispensers, particularly in the form of inhalers, are used as medical devices for delivering medication directly into the respiratory system of a user. An example of a medical aerosol dispenser is a metered-dose inhaler (MDI) used for delivering medication to manage respiratory conditions. When the patient presses down on the actuator, the MDI releases a precise dose of medication, which the patient inhales into their lungs. Such aerosol dispensers may also find application in various industries, including personal care, such as hairspray, deodorant, and shaving cream, and household products including air fresheners, cleaning sprays, and insect repellents. The aerosol dispenser have industrial application for applying lubricants, paints, adhesives, and other specialty chemicals.

In one embodiment, the propellant mixture, contained within an aerosol container, includes a first hydrofluoroolefin propellant 107 present in an amount of 50% to 99% w/w % of the propellant mixture, a second hydrofluoroolefin 109 propellant present in an amount of 1% to 50% w/w % of the propellant mixture, and an additive present in an amount up to 70% w/w % of the aerosol. The first hydrofluoroolefin (HFO) propellant is an important component of the propellant mixture, present in an amount ranging from 50% to 99% w/w % of the total propellant composition. Generally, an HFO propellant is a low-global-warming-potential gaseous or liquid compound used to generate pressure within the aerosol container, enabling the controlled release of the aerosolized composition upon actuation. Specifically, the first HFO propellant in this formulation serves as the primary driving force behind the aerosol delivery, providing sufficient vapor pressure to ensure proper atomization and droplet formation when dispensed. The concentration range of 50% to 99% w/w % allows for a balance between effective aerosolization and maintaining the structural and chemical stability of the formulation. Within the aerosol system, the first HFO propellant interacts with the second HFO propellant to fine-tune the pressure characteristics, evaporation rate, and overall dispersion efficiency. The composition and ratio of this propellant ensure that the aerosol remains effective in generating a fine mist while maintaining compatibility with other components, such as the additive and secondary propellant. In one example embodiment, the first hydrofluoroolefin propellant may be manufactured through fluorination processes involving hydrocarbon precursors, resulting in a compound with desirable thermodynamic properties such as moderate vapor pressure and low boiling point. Example materials for the first HFO propellant include trans-1,3,3,3-tetrafluoroprop-1-ene, which has been recognized for its environmentally favorable properties compared to traditional hydrofluorocarbons. Compared to prior-art propellants, the first HFO propellant offers improved environmental performance by reducing greenhouse gas emissions while maintaining efficient aerosol delivery. Additionally, its inclusion in high concentrations within the propellant mixture contributes to enhanced mist dispersion, prolonged airborne suspension, and improved user experience in applications requiring fine aerosolized particles.

The second hydrofluoroolefin (HFO) propellant is a second component of the propellant mixture, present in an amount ranging from 1% to 50% w/w % of the total propellant composition. In general, an HFO propellant is a low-global-warming-potential compound used to generate and regulate the internal pressure of an aerosol system, facilitating the controlled release of the aerosolized composition when actuated. Specifically, the second HFO propellant in this formulation is selected to complement the first HFO propellant by modifying key performance characteristics such as vapor pressure, evaporation rate, and dispersion efficiency. The concentration range of 1% to 50% w/w % allows for precise control over the aerosol's discharge properties, including droplet size and airborne suspension time, while maintaining formulation stability.

Within the aerosol system, the second HFO propellant interacts with the first HFO propellant to achieve an optimal balance of pressure and volatilization characteristics. By incorporating the second HFO propellant at controlled concentrations, the formulation can be fine-tuned to improve atomization, regulate droplet formation, and enhance the overall misting performance of the aerosol delivery system. In one example embodiment, the second hydrofluoroolefin propellant may be trans-1-chloro-3,3,3-trifluoropropene, a compound known for its favorable thermodynamic properties and compatibility with various aerosol formulations. This propellant can be manufactured through halogenation and fluorination processes, yielding a compound with controlled vapor pressure and reduced environmental impact.

Compared to prior-art propellants, which often relied on hydrofluorocarbons (HFCs) with high global warming potential, the second HFO propellant provides an environmentally preferable addition without compromising performance. The inclusion of this propellant in the specified concentration range contributes to an optimized aerosol discharge, ensuring that the mist remains airborne for extended durations while maintaining a consistent droplet size distribution. By carefully selecting the ratio of the second HFO propellant to the first HFO propellant, the system achieves enhanced air suspension properties, improved efficiency in aerosol delivery, and greater adaptability across various applications requiring fine particle dispersion.

The aerosol delivery system is designed to accommodate additional propellant components to enhance performance, sustainability, and cost efficiency. In other embodiments, the propellant mixture further includes at least one of carbon dioxide ($CO_2$) present in an amount of up to 30% w/w % of the propellant mixture and dinitrogen ($N_2$) present in an amount of up to 40% w/w % of the propellant mixture. FIGS. 3E and 3F illustrate structure of carbon dioxide 308 and dinitrogen 310, respectively. By incorporating these secondary propellants, the system benefits from improved atomization, optimized droplet size, enhanced environmental compatibility, and cost-effective formulation adjustments.

Carbon dioxide functions as a co-propellant that influences both the physical characteristics of the aerosol discharge and the overall environmental impact of the system. $CO_2$ is a naturally occurring, widely available gas that offers significant advantages when blended with hydrofluoroolefin (HFO) propellants such as trans-1,3,3,3-tetrafluoroprop-1-ene and trans-1-chloro-3,3,3-trifluoropropene. When incorporated in an amount of up to 30% w/w %, $CO_2$ contributes to enhanced atomization by increasing internal pressure within the aerosol container, facilitating the formation of finer mist particles.

The addition of $CO_2$ can also serve as a cost-reduction strategy, as $CO_2$ is less expensive than traditional HFO propellants while still maintaining efficient aerosolization properties. Furthermore, $CO_2$ enhances environmental sustainability by reducing reliance on higher-GWP (global warming potential) propellants and aligning with global regulatory initiatives aimed at lowering greenhouse gas emissions. The solubility of $CO_2$ in liquid components such as essential oils, alcohols, and esters allows it to function as an effective carrier for active ingredients, promoting uniform dispersion upon actuation. However, its limited solubility in non-polar hydrocarbon-based additives requires careful formulation to prevent phase separation.

Additionally, $CO_2$'s contribution to the aerosol's thermodynamic properties influences the evaporation rate of the dispensed droplets. By adjusting the proportion of $CO_2$, the formulation can be fine-tuned to achieve controlled evaporation, minimizing visible residue while ensuring prolonged fragrance diffusion. In one embodiment, a formulation containing 20% $CO_2$ and 80% HFO propellants balances cost efficiency, atomization, and airborne suspension time.

Dinitrogen ($N_2$) is a chemically inert, non-flammable gas that serves as a functional additive to the propellant mixture, particularly in applications requiring precise droplet size control and enhanced pressure regulation. When included in an amount of up to 40% w/w %, $N_2$ primarily functions as a pressure-enhancing and atomization-optimizing component without significantly altering the solvent properties of the aerosol.

One of the key advantages of incorporating $N_2$ is its ability to reduce droplet size, allowing for improved mist formation and sustained airborne suspension. This property makes it particularly suitable for environmental scenting applications, where maximizing the distribution of fragrance molecules is essential for prolonged diffusion. Additionally, $N_2$ assists in maintaining a consistent pressure profile within the aerosol container, mitigating pressure loss over time and ensuring uniform spray performance throughout the product's usage cycle.

From a sustainability perspective, $N_2$ provides an alternative to conventional hydrocarbon-based propellants while offering a zero-GWP solution. Its inert nature ensures chemical stability within the formulation, preventing unwanted interactions with essential oils, alcohols, and other active ingredients in the additive. Furthermore, because $N_2$ is non-condensable under typical aerosol storage conditions, its inclusion enhances the system's ability to generate a fine, well-dispersed mist without compromising the integrity of the active ingredients.

In one embodiment, a formulation containing 30% $N_2$ and 70% HFO propellants achieves optimal pressure stabilization while maintaining efficient atomization and uniform dispersion characteristics. This composition is particularly beneficial for formulations requiring consistent droplet sizes in the range of 25 to 50 microns, ensuring superior fragrance diffusion and environmental coverage.

The inclusion of $CO_2$ and $N_2$ within the propellant mixture introduces multiple benefits that enhance the performance and exclusivity of the aerosol delivery system. $CO_2$ and $N_2$ both contribute to increased internal pressure, enabling the formation of finer mist particles with improved dispersion characteristics. This results in greater airborne retention and more effective fragrance diffusion, making the system highly efficient for applications requiring extended suspension times. The widespread availability of $CO_2$ and $N_2$ reduces overall formulation costs, particularly when used as partial replacements for more expensive HFO propellants. This cost advantage enhances the commercial viability of the aerosol system without sacrificing performance. Additionally, by integrating environmentally friendly propellants with low or zero global warming potential (GWP), the formulation aligns with global efforts to reduce the carbon footprint of aerosol products. The use of $CO_2$ and $N_2$ ensures compliance with current and future environmental regulations while maintaining high-performance standards.

The optimized solubility of $CO_2$ in certain additives and the inert behavior of $N_2$ contribute to maintaining a homogeneous mixture, preventing phase separation, and ensuring consistent droplet size upon actuation. This leads to improved phase stability and reliable misting performance across different applications. Furthermore, the ability to tailor the propellant mixture by varying the ratios of HFOs, $CO_2$, and $N_2$ allows the system to be adapted for different industries, including room sprays, topical cooling products, medicinal aerosols, and industrial air treatment solutions. By leveraging the complementary properties of $CO_2$ and $N_2$, the aerosol delivery system achieves a balance between efficiency, sustainability, and cost-effectiveness.

For example, in a room spray formulation with extended airborne suspension, a propellant mixture consisting of 70% HFO blend, 20% $CO_2$, and 10% $N_2$ is combined with an additive comprising 30% essential oil blend with terpenic hydrocarbons. This formulation produces fine mist dispersion, ensures prolonged airborne presence, and optimizes fragrance diffusion. In a topical cooling aerosol, a propellant mixture of 60% HFO blend, 30% $CO_2$, and 10% $N_2$ is used alongside an additive containing 10% menthol-based essential oil blend. This composition enhances the cooling effect upon application, facilitates rapid evaporation, and leaves no visible residue on the skin. For industrial deodorizing spray applications, a propellant mixture of 50% HFO blend, 25% $CO_2$, and 25% $N_2$ is combined with an additive containing 50% high-load essential oil with antimicrobial properties. This formulation maximizes active ingredient delivery, improves cost efficiency, and enhances atomization for broad-area odor neutralization.

By strategically incorporating $CO_2$ and $N_2$ in varying proportions, the aerosol delivery system can be optimized for diverse applications while maintaining superior performance, regulatory compliance, and environmental sustainability.

The additive is a critical component of the aerosol composition, present in an amount of up to 70% w/w % of the aerosol. In general, the additive serves multiple functional purposes, such as enhancing formulation stability, contributing to the dispersion and evaporation properties of the aerosol, and delivering active ingredients or sensory agents, such as fragrances or essential oils, to the target environment. The specific concentration range of up to 70% w/w % allows for a high degree of flexibility in formulation, ensuring compatibility with different aerosol applications while maintaining optimal dispersion characteristics. The balance between the additive and the propellant mixture is carefully controlled to ensure effective atomization upon dispensing and prolonged airborne suspension.

A key characteristic of the additive is its specific gravity, which falls within a range of 0.5 to 1.2. Specific gravity, defined as the ratio of the density of the additive to the density of water, influences the overall behavior of the aerosol formulation. By maintaining a specific gravity within this range, the additive achieves compatibility with the propellant mixture, allowing for stable dispersion without phase separation. A specific gravity below 0.5 would result in excessive buoyancy and potential immiscibility, whereas a value above 1.2 could lead to sedimentation or uneven spray distribution. The defined specific gravity range ensures that the additive remains evenly distributed within the formulation, preventing stratification and maintaining consistent performance throughout the product's shelf life. In a preferred embodiment, the specific gravity of the additive is 0.75 to 1.

The molecular compatibility of the additive with the propellant mixture is another crucial aspect of the formulation. Molecular compatibility ensures that the additive remains homogenized within the aerosol without undergoing phase separation, precipitation, or degradation. This compatibility is quantified by the partition coefficient, which is defined within the range of −0.5 to 4. The partition coefficient represents the additive's relative solubility between polar and non-polar environments, indicating its ability to dissolve effectively within the propellant mixture. A partition coefficient within this specified range allows the additive to exhibit balanced solubility, ensuring it remains dispersed within the aerosol composition while avoiding excessive affinity toward either hydrophilic or lipophilic phases. This property is essential for maintaining uniform mist dispersion upon actuation and preventing the formation of residue or uneven droplet distribution.

Another critical parameter of the additive is its water content, which is controlled to a maximum of 2% w/w % of the additive. Water content plays a significant role in the stability and performance of the aerosol formulation. Excess water within the formulation can lead to phase separation, reduced solubility of certain active ingredients, and potential interactions with the hydrofluoroolefin (HFO) propellant mixture, which has limited miscibility with water. By maintaining the water content below 2%, the formulation avoids unwanted instability while ensuring that the additive remains effectively incorporated into the aerosol system.

Furthermore, the controlled water content prevents nozzle clogging, minimizes the risk of formulation degradation over time, and ensures consistent aerosol discharge characteristics.

In one example embodiment, the additive may comprise essential oils, refined terpenic hydrocarbons, esters, or alcohol-based solvents that align with the specified physical and chemical parameters. Nonlimiting examples of Essential oils, such as citrus extracts, *eucalyptus* oil, or lavender oil may provide functional benefits such as fragrance dispersion while maintaining molecular compatibility with the propellant mixture. In another example embodiment, the additive may include co-solvents or stabilizing agents that enhance the homogeneity of the formulation without exceeding the defined water content threshold. The manufacturing process of the additive may involve distillation, extraction, or synthetic refinement to ensure that the final formulation meets the required specifications for stability and performance. Specifically, the additive may include one or more compounds that are molecularly compatible with the propellant mixture to prevent phase separation, precipitation, or degradation within the aerosol container. The additive may function as a carrier medium for active substances, such as fragrances, disinfectants, deodorizers, or surface treatments, depending on the intended application of the aerosol delivery system. Additionally, the additive may contribute to modifying droplet size, viscosity, or volatility, thereby influencing the dispersion profile and overall performance of the aerosol when dispensed.

Compared to prior-art aerosol formulations, which often suffer from phase instability, uneven dispersion, or excessive water content that can interfere with propellant performance, the controlled selection of the additive within the specified parameters ensures a highly stable and efficient aerosol system. By carefully regulating the additive's concentration, specific gravity, molecular compatibility, and water content, the aerosol delivery system achieves enhanced atomization, prolonged airborne suspension, and consistent dispersion, making it suitable for applications requiring fine mist delivery, such as environmental scenting, air freshening, or surface treatment.

Within the aerosol system, the additive interacts with the propellant mixture to ensure proper atomization and dispersion of the aerosolized composition. The specific selection of the additive depends on its compatibility with hydrofluoroolefin (HFO) propellants and its ability to remain uniformly distributed without phase separation over the product's shelf life. In one example embodiment, the additive may comprise a polar compound such as an alcohol, ketone, or ester, which enhances solubility and improves dispersion characteristics. In another example embodiment, the additive may include a non-polar compound such as refined terpenic hydrocarbons or essential oils, which contribute to sensory or functional properties of the aerosolized formulation.

In one embodiment, the additive is present in an amount of up to 70% w/w % of the aerosol, allowing for a formulation designed for applications where the additive is the primary functional component. This embodiment is particularly useful in applications requiring high-concentration active ingredients, such as disinfectants, surface treatments, or industrial deodorizers. The high proportion of the additive ensures that a substantial volume of the dispensed aerosol consists of the active component, maximizing the efficacy of the delivered material.

In this embodiment, the additive may include high-load essential oils, botanical extracts, or active agents that serve a functional role beyond fragrance, such as antimicrobial action, allergen neutralization, or therapeutic benefits. Examples include tea tree oil for antimicrobial applications, citronella oil for insect repellent formulations, or ethanol-based carriers for sanitizing applications. To maintain proper aerosolization, the additive is carefully formulated to remain molecularly compatible with the HFO propellants, ensuring phase stability and preventing nozzle clogging. The viscosity of the additive is also controlled to maintain efficient atomization when dispensed through the micromist actuator.

A challenge with high-additive formulations is ensuring that the droplets remain finely dispersed and airborne for an adequate duration. To mitigate rapid settling or excessive weight, surfactants or dispersion-enhancing agents may be incorporated to optimize misting characteristics. However, formulations approaching the upper limit of 70% additive content may exhibit slightly reduced airborne suspension times compared to lower-additive embodiments, making this formulation most effective for direct application aerosols rather than room-wide diffusion.

In another embodiment, the additive is present in an amount ranging from 10% to 40% w/w % of the aerosol, making it particularly well-suited for fragrance delivery applications, such as air fresheners, environmental scenting systems, or personal care sprays. The balance between the propellant mixture and the additive in this range ensures that the droplets remain sufficiently light to sustain prolonged airborne suspension while still carrying a noticeable and effective fragrance concentration.

Fragrance components within this embodiment may include essential oils, synthetic aroma compounds, or blended fragrance oils tailored to achieve a specific olfactory profile. Common examples include lavender oil, citrus extracts, sandalwood oil, and proprietary perfume compositions designed to enhance sensory appeal. The use of refined terpenic hydrocarbons as carriers can further improve solubility within the HFO propellant mixture, ensuring uniform dispersion without phase separation. Essential oils that can be used as the additive in the aerosol delivery system must satisfy specific physical and chemical requirements, including a specific gravity within the range of 0.5 to 1.2, molecular compatibility with the propellant mixture such that the additive comprises a partition coefficient in the range of –0.5 to 4, and a water content of at most 2% w/w % to prevent phase separation or instability. Citrus oils, such as lemon oil, orange oil, and bergamot oil, are well-suited due to their specific gravity typically falling between 0.8 and 1.0, their partition coefficients within the required range, and their naturally low water content. These oils contain volatile terpenes like limonene, which enhance solubility in hydrofluoroolefin (HFO) propellants while providing effective odor masking and fragrance dispersion. Lavender oil and sandalwood oil also meet these criteria, offering stability in the aerosol formulation with a specific gravity around 0.9 to 1.0, ensuring homogeneous dispersion without separation. Their molecular compatibility with the propellant mixture allows for effective integration into the formulation without disrupting atomization or misting efficiency. *Eucalyptus* oil and peppermint oil, containing eucalyptol and menthol respectively, maintain a suitable partition coefficient, remain fully soluble in the propellant mixture, and exhibit a water content well below 2%, ensuring stability and non-clogging performance. Tea tree oil and rosemary oil, known for their antimicrobial and air-freshening properties, also satisfy these conditions, providing enhanced functional benefits while maintaining uniformity in the aerosol. Additionally, refined terpenic hydrocarbons such as pine oil and cedrol offer excellent solubility within the HFO propellant system and maintain the required physicochemical properties for stable aerosolization. By selecting essential oils that precisely match the required parameters, the formulation ensures optimal performance, including consistent mist dispersion, prolonged airborne suspension, and sustained sensory impact without compromising the integrity of the aerosol system.

A key factor in this embodiment is maintaining the additive concentration below 40% w/w %, as exceeding this threshold leads to increased droplet weight, causing them to settle more quickly and diminishing their ability to remain airborne for extended periods. To enhance mist diffusion and prolong airborne presence, the formulation may incorporate low-viscosity co-solvents or volatility-enhancing agents that facilitate controlled evaporation without leaving noticeable residues. The result is a fine, evenly distributed mist that effectively disperses the fragrance while avoiding excessive accumulation on surfaces.

In one embodiment, the additive is present in an amount of up to 10% w/w % of the aerosol. Despite the low concentration, this formulation has been found to effectively eliminate the metallic smell associated with the propellant mixture, improving the overall sensory experience of the aerosol product. The minimal additive content ensures that the core functionality of the propellant system remains intact while providing subtle yet essential enhancements in fragrance, odor masking, or cooling effects. By keeping the additive in a concentration of up to 10% w/w %, the aerosol produces a cooling effect that can be used for purposes of topical applications.

When hydrofluoroolefin (HFO) propellants such as trans-1,3,3,3-tetrafluoroprop-1-ene and trans-1-chloro-3,3,3-trifluoropropene are used in an aerosol system, a slight metallic or chemical odor can sometimes be detected upon actuation. While these HFO propellants are considered low-odor compared to legacy hydrofluorocarbon (HFC) propellants, trace impurities or the inherent chemical properties of fluorinated gases can contribute to an undesirable scent in unscented formulations.

Through controlled testing, it was determined that only a small amount of additive, ranging from just a few drops up to 10% w/w %, was sufficient to eliminate the metallic smell while maintaining the formulation's stability and performance. This minimal additive concentration allows for odor neutralization without compromising the physical properties of the aerosol, such as viscosity, atomization efficiency, or evaporation characteristics.

The additive in this embodiment preferably comprises essential oils with natural odor-masking properties, refined terpenic hydrocarbons, or mild fragrance components. Examples include citrus-based essential oils like lemon or orange oil, which contain limonene, a natural solvent that blends well with HFO propellants and effectively neutralizes unwanted chemical odors. Other effective odor-masking additives include *eucalyptus* oil, lavender oil, and peppermint oil, each contributing to a pleasant, mild scent that counteracts the propellant's metallic notes without overwhelming the intended application.

In addition to odor neutralization, this low-additive embodiment is also well-suited for topical cooling products, where a rapid evaporation effect is desired. Because the propellant mixture itself plays a key role in cooling through phase transition, only a minimal amount of additive is required to enhance the sensory perception of freshness upon skin contact. In such formulations, the additive may include menthol-based essential oils, such as peppermint or spearmint oil, which provide a mild cooling sensation while complementing the evaporative cooling action of the propellant.

This embodiment is also beneficial for medicinal aerosol applications, where only a small amount of active ingredient is required to deliver therapeutic effects. For example, antiseptic sprays, respiratory inhalants, or skin-soothing aerosols can utilize this low-additive formulation to ensure precise dosing while maintaining homogeneous dispersion within the propellant mixture.

The additive can be manufactured through various chemical processes, including distillation, extraction, or synthesis, depending on the specific nature of the compound. Example materials for the additive may include ethanol, isopropanol, methyl ethyl ketone, ethyl acetate, limonene, or other functional ingredients that enhance the aerosol's performance. Compared to prior-art formulations that may suffer from phase instability or poor droplet control, the inclusion of an additive within the specified concentration range ensures a stable, homogeneous dispersion with enhanced air suspension properties. By optimizing the additive's composition and concentration, the aerosol delivery system achieves improved mist dispersion, extended airborne retention, and enhanced efficiency in delivering active ingredients to the intended environment.

The aerosol container 104 of the aerosol dispenser 100 component holds the material, such as the propellant mixture 106, and the additive mixture 108. In one embodiment, the propellant mixture, and the additive mixture are in pressurized form. The aerosol container is shown to have a cylindrical shape in FIGS. 1A and 1B, other shapes and sizes of the container suitable for retaining a pressurized aerosol are also covered within the scope of the invention. For example, the aerosol container has the cylindrical shape that provides a compact and space-efficient design, or rectangular or square shapes, which can be more ergonomic for certain applications and allow a better grip of the aerosol container by the user.

The aerosol containers can be made from different materials, such as plastic, aluminum, scrap metal, steel, and glass. Plastic containers are lightweight and versatile, and can be molded into various shapes and sizes and are often used for consumer products. Aluminum is also used for aerosol containers due to its lightweight nature, durability, and resistance to corrosion, and steel containers are known for their strength and durability, making them suitable for applications requiring robust packaging, such as industrial aerosols. Glass containers are used in some aerosol dispensers, particularly for products where visibility or product compatibility is required. The dimensions and size of the canister may vary widely, and the material of the canister may be any material suitable for retaining a pressurized aerosol. Further, volume of the aerosol container may be selected from the group consisting of 4 oz, 9 oz, 16 oz, 24 oz, and 28 oz.

The propellant mixture 106 is contained within the aerosol container and includes a first component being trans-1,3,3,3-Tetrafluoroprop-1-ene (Solstice® 1234ze). In an embodiment, a proportion of the first component ranges in between 50% and 99% by volume of a total propellant mixture contained within the aerosol container. The propellant mixture has a second component being Trans-1-chloro-3,3,3-trifluoropropene (Solstice® 1233zd) in a proportion ranging between 1% and 50% by volume of the total propellant mixture. In the embodiment, the propellant mixture is non-flammable and has minimal environmental impact. The weight average density may range from 1.286 kg/m³ to 1.292 kg/m³.

The non-flammable propellant mixture minimizes the risk of fire or explosion associated with aerosol dispensers. The non-flammable mixtures are safer for use in various environments, including homes, workplaces, and healthcare facilities. The propellant mixture minimizes environmental impact to reduce ozone depletion and greenhouse gas emissions. In an example, the propellant mixture comprises alternative propellants with lower global warming potentials (GWPs) and reduced environmental impact, such as hydrofluoroolefins (HFOs) or compressed gases like nitrogen or carbon dioxide. Such aerosol dispensers having non-flammable, environmentally friendly propellant mixtures provide the advantages of improved safety, reduced environmental footprint, and compliance with regulatory requirements.

The aerosol actuator, or micromist actuator, is an aerosol dispensing mechanism designed to produce an ultra-fine mist by precisely controlling the size and distribution of expelled liquid droplets. The system, in a preferred embodiment, employs a 0.4 mm actuator, specifically configured to optimize molecular breakup during atomization. This ensures efficient and uniform spray, even with high active material concentrations. The micromist actuator is coupled to the aerosol valve 120. Generally, a micromist actuator functions by utilizing a small orifice and controlled fluid dynamics to break down a liquid formulation into tiny, uniform droplets, optimizing spray dispersion and airborne suspension. It is commonly used in applications such as air fresheners, medicinal aerosols, disinfectants, and personal care products, where fine mist delivery enhances product effectiveness and efficiency. Specifically, in the context of the disclosed aerosol delivery system, the micromist actuator is engineered with an actuator orifice having an exit diameter 116 ranging from 0.25 microns to 0.80 microns, ensuring controlled atomization of the aerosolized composition. This fine orifice size enables the propellant mixture and additive to be expelled in uniform microdroplets, optimizing the particle size distribution to fall within the ideal range for sustained air suspension. The actuator works in conjunction with the balanced vapor pressure of the propellant mixture, which consists of trans-1,3,3,3-tetrafluoroprop-1-ene and trans-1-chloro-3,3,3-trifluoropropene, to produce an aerosol plume with droplet sizes averaging between 25 microns to 50 microns, as measured by laser diffraction particle size analysis. This controlled atomization prevents large droplets from forming and settling too quickly, ensuring more efficient diffusion and fragrance longevity. Additionally, the actuator's design helps prevent clogging or inconsistent spray patterns by maintaining the homogeneity of the additive, which comprises essential oils, alcohols, ketones, esters, or refined terpenic hydrocarbons that remain molecularly compatible with the propellant mixture. Compared to conventional actuators, which often produce larger, uneven droplets that settle quickly, the micromist actuator in this system enhances spray consistency, airborne retention, and user experience, making it ideal for applications such as environmental scenting, air purification, and topical cooling aerosols.

In some embodiments, the aerosol container may include a valve opening 122 configured to receive the aerosol valve. The valve opening ideally has a diameter 124 of 0.25 inches; however, other diameters may be utilized depending on the desired flow rate, exit diameter, and operational characteristics of the aerosol delivery system. The diameter of the valve opening may be selected based on factors such as propellant pressure, formulation viscosity, and intended spray characteristics, ensuring controlled and efficient dispensing of the aerosolized composition. For example, in some embodiments, a smaller valve opening diameter may be utilized to regulate a lower flow rate, which may be advantageous for applications requiring finer mist dispersion and prolonged airborne suspension. Conversely, a larger valve opening diameter may accommodate a higher flow rate, facilitating increased discharge volume suitable for applications requiring greater coverage or faster dispersion. The selection of an appropriate valve opening diameter may also correspond to variations in micromist actuator orifice size, ensuring that the particle size distribution and spray pattern remain optimized for the intended use. While specific diameters are described, it is understood that the present invention is not limited to these values. Any suitable diameter that allows for the attachment of the valve and facilitates controlled aerosol dispensing may be employed, including those currently known or developed hereafter. Such variations are considered to be within the spirit and scope of the present disclosure.

The aerosol 114, when dispensed through the micromist actuator, forms droplets 118 having a mean droplet size ranging from 30 microns to 50 microns, as measured by laser diffraction particle size analysis. When the aerosol is dispensed through the micromist actuator, it forms droplets with a mean droplet size ranging from 30 microns to 50 microns, as measured by laser diffraction particle size analysis. In general, droplet size is a critical factor in aerosol delivery systems, as it influences the dispersion behavior, airborne suspension time, and deposition characteristics of the aerosolized composition. The specified droplet size range ensures that the aerosol forms a fine mist with particles small enough to remain suspended in the air for an extended duration while being large enough to prevent excessive evaporation or unintended inhalation, depending on the intended application. Specifically, the micromist actuator is designed to regulate the droplet formation process by controlling the rate and pattern of aerosol ejection. The actuator features an orifice with a precisely engineered exit diameter, ensuring that the aerosolized liquid undergoes sufficient atomization to achieve the targeted mean droplet size range. The combination of propellant pressure, actuator geometry, and formulation properties work together to create a consistent mist characterized by uniform droplet distribution.

Within the aerosol system, the formation of droplets in the 30-micron to 40-micron range allows for optimal airborne behavior. Droplets of this size are sufficiently fine to remain suspended for an extended period, facilitating widespread dispersion across a given area while minimizing rapid settling. The interaction between the propellant mixture and the additive influences the viscosity, surface tension, and evaporation rate of the aerosol, which in turn affects droplet formation and stability upon release. By controlling these parameters, the aerosol delivery system ensures a mist that remains airborne for at least one hour while avoiding excessive aggregation or premature deposition on surfaces. After dispersion of the aerosol, at least 50% of the aerosol droplets remain airborne after 30 minutes, as measured in a 16 m³ controlled test chamber. In one example embodiment, the micromist actuator may utilize precision-molded polymer or metal components to create a controlled flow path that optimizes atomization. The actuator orifice size and internal nozzle geometry are carefully engineered to match the propellant pressure and formulation properties, ensuring repeatable and controlled droplet generation. The droplet size distribution is verified using laser diffraction particle size analysis, a widely recognized method for measuring aerosolized droplet characteristics with high accuracy. Compared to prior-art aerosol systems, which may produce larger, less uniform droplets that settle quickly or fail to achieve consistent misting performance, the controlled formation of 30-micron to 40-micron droplets enhances aerosol efficiency. This improvement allows for better coverage, extended airborne suspension, and improved delivery of active ingredients, making the aerosol delivery system more effective in applications such as air freshening, disinfection, and surface treatment.

Droplets smaller than 25 microns pose a higher risk of deep lung penetration. Particles below 10 microns are classified as 'respirable,' meaning they can reach the alveoli (deep lung tissue), increasing the potential for inhalation hazards. Maintaining droplet size above 25 microns ensures that the spray settles appropriately rather than staying airborne for prolonged periods, reducing inhalation risks. The average micron size of the droplets produced by the aerosol formulation is more ideally 30-40 micron, which is provide an optimal balance between dispersion, evaporation rate, and stability. Droplets in this range are small enough for effective diffusion but large enough to avoid excessive airborne retention or rapid evaporation. Droplets larger than 50 microns may cause uneven dispersion and lead to heavier settling, which can affect user experience and product efficiency. When droplets are too large, they tend to fall out of suspension quickly, reducing their ability to spread evenly in the air. This could make the spray feel 'wet' or leave noticeable residues on surfaces instead of forming a fine mist. The microdroplet size of the aerosol delivery system is optimized to have an average diameter of 34.9 microns, ensuring prolonged airborne suspension, uniform coverage across large areas, and efficient evaporation before settling on surfaces. The controlled droplet size contributes to enhancing diffusion within the air, improving the overall sensory experience by allowing the aerosolized composition to disperse more effectively. Additionally, the precise droplet size facilitates rapid evaporation, preventing the formation of visible residues on surfaces, which is particularly beneficial for applications requiring a clean and residue-free dispersion. By maintaining this optimized droplet size, the aerosol system achieves improved performance in air freshening, disinfecting, and other misting applications where prolonged suspension and even distribution are essential.

The aerosol delivery system utilizes a propellant mixture with moderate polarity, primarily influenced by the molecular structure of its hydrofluoroolefin (HFO) components. The first propellant, 1234ze, exhibits a significant dipole moment due to the presence of carbon-fluorine (C—F) bonds, contributing to its partial polarity. The second propellant, 1233zd, contains carbon-chlorine (C—Cl) bonds, which further increase the overall polarity of the mixture. This moderate polarity allows for broad miscibility with both polar and non-polar compounds, ensuring homogeneous dispersion of the additive within the aerosol formulation. The propellant mixture readily dissolves polar compounds such as alcohols, ketones, and esters, which enhances the solubility of active ingredients and improves the stability of the aerosolized composition. Additionally, the propellant mixture can accommodate non-polar compounds, including refined terpenic hydrocarbons and essential oils, allowing for versatile formulation options across different applications. However, certain compounds remain incompatible with the propellant system. Excess water exhibits low solubility with HFO propellants, leading to potential phase separation or reduced performance. Similarly, solid particles pose a challenge, as active materials must be fully dissolved or emulsified within the aerosol to prevent clogging, sedimentation, or inconsistent spray performance. By leveraging the moderate polarity of the propellant mixture while avoiding incompatible compounds, the aerosol delivery system maintains formulation stability, effective atomization, and consistent aerosol dispersion.

The aerosol delivery system leverages the low surface tension properties of hydrofluoroolefin (HFO) propellants to enhance atomization efficiency. By naturally reducing surface tension, the propellants facilitate the breakup of the liquid formulation into fine, uniform droplets upon dispersion. Lower surface tension allows for improved mist formation, ensuring that the aerosolized composition achieves optimal coverage and prolonged airborne suspension. Additionally, viscosity control is a critical factor in maintaining system performance and preventing mechanical issues. By adjusting the formulation to maintain viscosity below 50 centipoise (cP), the aerosol system ensures a consistent flow through the actuator and valve components. A viscosity within this range prevents clogging in the dispensing mechanism while promoting uniform spray characteristics. Proper viscosity adjustment also supports efficient atomization by allowing the propellants to effectively disperse the active materials without excessive resistance or irregular droplet formation. Together, the low surface tension and controlled viscosity of the aerosol formulation contribute to reliable operation, fine mist generation, and enhanced dispersion efficiency.

In a preferred embodiment, the viscosity of the aerosol is maintained within the range of 0.5 to 3.0 centipoise at room temperature, ensuring that the formulation flows smoothly and consistently through the delivery system. This low viscosity is critical for achieving optimal atomization, as it allows the propellant mixture to efficiently break up into fine droplets upon actuation. By keeping the viscosity within this specified range, the system minimizes the risk of clogging the micromist actuator and aerosol valve, thereby promoting a uniform spray pattern and consistent performance. Furthermore, the low viscosity contributes to a rapid and even dispersion of the active components, enhancing the overall effectiveness of the aerosol in delivering its intended functional and sensory benefits.

The aerosol delivery system relies on maintaining a homogeneous mixture to prevent phase separation and ensure consistent performance. The active materials must blend uniformly with the propellants to avoid formulation instability, as any incompatibility can lead to issues such as sedimentation, where active materials settle at the bottom of the container, clogging due to poor miscibility causing blockages in the actuator, or uneven dispersion that results in inconsistent spray patterns and reduced efficacy. The interaction between the active materials and propellants is also crucial for atomization efficiency. To achieve a fine mist with an average droplet size of 34.9 microns, the active material must not significantly alter the viscosity or surface tension of the formulation beyond optimal limits. Proper atomization depends on the ability of the propellants to break down the mixture into uniform droplets, ensuring controlled dispersion upon actuation. Additionally, volatility and evaporation characteristics play a vital role in aerosol performance. The active material must be compatible with the vapor pressure properties of the propellants to facilitate proper evaporation in the air. This alignment prevents droplets from lingering too long, which could result in visible residues on surfaces or incomplete diffusion of the active ingredient. By optimizing miscibility, atomization, and evaporation properties, the aerosol system delivers a fine, evenly dispersed mist with effective airborne suspension and consistent performance across various applications.

In an embodiment, the additive mixture 108 includes a proportion ranging up to 70% by weight, and an additive density having a specific gravity within a range of 0.5 to 1.2. Specific gravity refers to the ratio of the density of a substance to the density of a reference substance, typically water. In the context of an additive density within an aerosol solution, specific gravity provides a measure of the relative weight of the additive mixture compared to water. A specific gravity within a range of 0.5 to 1.2 indicates that the additive mixture is lighter than water at its lowest point and slightly heavier at its highest point. This range ensures that the additive mixture remains sufficiently buoyant within the aerosol solution, preventing settling or separation of components over time. By maintaining a specific gravity within this range, the additive mixture disperses evenly throughout the aerosol solution, promoting uniformity in product composition and performance.

The specific gravity improves the stability and homogeneity of the formulation, ensuring that the additive components remain uniformly suspended for the propellant mixture. A specific gravity that is too high may cause the additive mixture to sink to the bottom of the container, leading to uneven distribution and potential clogging of the aerosol valve during dispensing. Conversely, a specific gravity that is too low may result in floating or stratification of the additive mixture, compromising the consistency and efficacy of the product. Therefore, maintaining an optimal specific gravity is essential for achieving reliable aerosol performance, consistent product quality, and enhanced user satisfaction.

In various embodiments, the additive mixture is an additive mixture to mix with the propellant mixture, and can be one of a fragrance, a disinfectant, and a medicine for an inhaler. The density with a gravity of the additive mixture is 0.5 to 1.2. The weight percent composition of the additive mixture may range up to 70%. In various embodiments, the weight percent composition of the additive mixture is below 10% and the additive mixture still functions effectively as a cooling topical, whereas in other embodiments, such as application as a fragrance or environmental scenting agent, the weight percent composition of the additive mixture is between 10% to 40%. In an example, the smaller proportion of additive mixture allows for more propellant mixture in the aerosol solution, and the resulting increase in propellant concentration elevates the pressure within the container. This increased pressure generates greater force upon release, facilitating efficient dispersion of the aerosol contents upon activation. The enhanced force ensures that the product reaches its intended target effectively, whether it is dispersing fragrance, disinfectant, or medicinal compounds. Excessive additive mixture, greater than said proportion may reduce effectiveness of the aerosol solution. In such solutions, additive mixture may result in a diluted concentration of active ingredients or fragrances, reducing the potency or desired effect of the aerosol product. Additionally, an overly saturated additive mixture might compromise the stability and consistency of the aerosol solution, potentially causing clogging or uneven distribution during application. The additive mixture within the range of proportion achieves the desired product performance without compromising efficacy.

The additive density within the specific gravity range of 0.5 to 1.2 provides the additive mixture to achieve optimal dispersion and stability within the aerosol container. The additive density having a specific gravity within this range, allows the fragrance to disperse uniformly throughout the propellant mixture, preventing undesirable stratification or separation of components, and facilitates consistent and reliable fragrance delivery with each spray, enhancing the overall user experience. Additionally, fragrances within this specific gravity range exhibit enhanced stability, minimizing the risk of sedimentation, or degradation over time, thus preserving the fragrance's original scent profile and performance characteristics for a prolonged period of time. The specific gravity range of 0.5 to 1.2 provides optimal fragrance dispersion and compatibility and enhances product quality, and safety in aerosol mixtures.

In another embodiment, the proportion of the additive mixture may be below 10% for mixing with the propellant mixture. In the embodiment, the lesser proportion of the additive mixture and more propellant mixture allows the mixture to be more pressurized and have more force during dispensing, thereby more effective, than a mixture having higher proportion of the additive mixture. The mixture of the propellant mixture and the additive mixture is selected at a specified proportion as described to achieve maximum effectiveness for the aerosol dispenser.

In an embodiment, the additive mixture is molecularly compatible with the propellant mixture, such that the additive mixture and the propellant mixture have harmonious interaction between their molecules exhibiting a mutual affinity or stability when combined or mixed together. The molecules composing the fragrance blend seamlessly integrate with those of the propellant mixture without causing adverse reactions or undesirable changes in composition, chemical structure, or performance characteristics. In the context of an aerosol solution, molecular compatibility refers to the ability of the various components within the solution to interact harmoniously at a molecular level. This compatibility ensures that the different substances present in the aerosol formulation can coexist without causing undesirable reactions, precipitation or separation. Molecular compatibility is essential for maintaining the stability, efficacy, and safety of the aerosol product throughout its shelf life and during usage.

The additive within the aerosol delivery system is specifically formulated to be molecularly compatible with the propellant mixture, ensuring a homogeneous and stable composition throughout the product's lifecycle. Molecular compatibility refers to the ability of the additive to dissolve or remain uniformly suspended within the propellant mixture without undergoing phase separation, precipitation, or degradation. This characteristic is essential for maintaining consistent aerosol performance, ensuring effective atomization upon dispensing, and preventing clogging or uneven spray patterns.

The additive ideally includes an essential oil, which provides both functional and sensory benefits, including fragrance dispersion, antimicrobial properties, and solvent characteristics that enhance overall formulation stability. Essential oils are complex mixtures of volatile organic compounds, including terpenes, alcohols, aldehydes, and esters, that exhibit varying degrees of polarity. The specific chemical composition of an essential oil influences its miscibility with the hydrofluoroolefin (HFO) propellants used in the aerosol delivery system. Essential oils with balanced polarity are particularly well-suited for maintaining molecular compatibility, as they can effectively dissolve within the propellant mixture while preventing the formation of separate phases.

To further ensure molecular compatibility, the additive includes at least one compound selected from either a group of polar compounds or a group of non-polar compounds. In one embodiment, the additive includes at least one polar compound selected from alcohols, ketones, and esters. These polar compounds exhibit moderate solubility in the HFO propellant mixture while enhancing the dispersion of other active components. Alcohols, such as ethanol or isopropanol, can serve as co-solvents that help dissolve fragrance molecules and improve overall miscibility. Ketones, such as methyl ethyl ketone or acetophenone, provide additional solubility control, ensuring the essential oil remains evenly distributed. Esters, such as ethyl acetate or benzyl acetate, contribute to both solvent properties and fragrance longevity, improving the overall sensory experience of the aerosol.

In another embodiment, the additive includes at least one non-polar compound selected from refined terpenic hydrocarbons and essential oils. Terpenic hydrocarbons, such as limonene or pinene, exhibit high volatility and excellent compatibility with HFO propellants, ensuring that the aerosol formulation remains stable while contributing to fragrance diffusion. These hydrocarbons function as natural solvents within the formulation, allowing for enhanced dispersion of other essential oil components. Essential oils themselves, including *eucalyptus* oil, lavender oil, and sandalwood oil, provide aromatic properties while maintaining molecular compatibility due to their mixed composition of both polar and non-polar constituents.

By incorporating a combination of polar and non-polar compounds within the additive, the aerosol formulation achieves an optimal balance of solubility and stability. The molecular compatibility of the additive with the propellant mixture ensures that the formulation remains homogeneous within the aerosol container, preventing sedimentation or phase separation over time. This uniformity enhances the efficiency of the aerosol delivery system, ensuring that each actuation releases a consistent mist with evenly dispersed active ingredients.

In one example embodiment, the additive comprises a blend of an essential oil, such as bergamot oil, combined with ethanol as a polar co-solvent and limonene as a non-polar carrier. This formulation ensures complete miscibility within the propellant mixture, maintaining a stable and effective aerosol composition. In another example embodiment, the additive consists of a refined terpenic hydrocarbon, such as $\alpha$-pinene, in combination with an ester, such as benzyl acetate, which provides enhanced fragrance longevity and uniform dispersion.

Compared to prior-art aerosol formulations, which may suffer from phase instability, inconsistent spray characteristics, or poor solubility of active ingredients, the controlled selection of molecularly compatible additives in this aerosol system ensures improved performance, prolonged shelf life, and enhanced user experience. By leveraging the miscibility properties of both polar and non-polar compounds, the formulation achieves a stable, homogeneous, and highly effective aerosol composition suitable for fragrance applications, air fresheners, topical cooling products, and medicinal aerosols.

In various embodiments, the additive mixtures includes one of a fragrance, a disinfectant or a medicinal agent that are molecularly compatible with the propellant mixture are selected. Such additive mixtures mix or interact with propellant mixture without causing adverse reactions, such as separation, precipitation, degradation, or any form of chemical instability. In an embodiment, factors to consider for selecting the additive mixture that are molecularly compatible with the propellant mixture are stability, uniformity of dispersion, safety, and performance. Other factors may include chemical composition of both the additive and propellant components to minimize reactivity and potential for chemical reactions that could compromise product stability or safety, and solubility characteristics to dissolve uniformly within the propellant mixture without causing phase separation or precipitation. Additionally, considerations such as polarity, molecular weight, and functional groups are taken into account to promote cohesive molecular interactions and prevent aggregation or degradation of the aerosol solution over time. Furthermore, physical properties such as vapor pressure, viscosity, and density are optimized to facilitate homogeneity and stability throughout storage and usage.

In some embodiments, the additive includes a fragrance component present in an amount of up to 10% w/w % of the additive. In general, a fragrance component is an aromatic compound or blend of compounds designed to impart a specific scent to the aerosol formulation, enhancing sensory appeal for applications such as air fresheners, personal care products, and household sprays. The specified concentration range ensures that the fragrance is perceptible and long-lasting while preventing overpowering scent intensity or undesirable chemical interactions within the formulation. Specifically, the fragrance component may include natural or synthetic aromatic compounds selected for their volatility, stability, and compatibility with the propellant mixture and other ingredients. The fragrance component may consist of essential oils, esters, aldehydes, ketones, or terpenes, each contributing to the overall olfactory profile of the aerosol. The selection of fragrance materials depends on factors such as evaporation rate, solubility, and interaction with the other components of the aerosol system.

Within the aerosol system, the fragrance component interacts with the propellant mixture and other formulation ingredients to ensure even distribution upon dispensing. The fragrance molecules are dissolved or suspended within the additive and are released in a controlled manner when the aerosol is actuated. The micromist actuator 112 and the controlled droplet size contribute to dispersing the fragrance effectively, allowing the scent to remain perceptible for an extended duration. The specific ratio of the fragrance component within the additive influences the intensity, longevity, and diffusion characteristics of the scent in the surrounding environment.

Compared to prior-art aerosol formulations, which may suffer from fragrance degradation, phase separation, or inconsistent scent dispersion, the controlled inclusion of the fragrance component in the specified concentration range ensures a stable, well-balanced aroma that is evenly dispersed upon actuation. By optimizing the formulation, the aerosol delivery system enhances user experience, providing a long-lasting and evenly distributed scent while maintaining compatibility with the propellant mixture and overall stability of the aerosolized composition.

In some embodiments, the additive mixture comprises aromatic compounds including both natural and synthetic molecules, such as aldehydes, alcohols, esters, ketones, and terpenes. FIGS. 3C and 3D illustrate structure of aldehydes Formaldehyde 304, and Methylglyoxal 306, respectively. The additive mixture may also include essential oils extracted from plants, flowers, fruits, and herbs that are often incorporated into additive mixtures for their fragrance properties. Additionally, the additive mixture may comprise solvents for dissolving and diluting the aromatic compounds and the essential oils for aerosol dispersion. Essential oils are secondary metabolites that comprise small organic molecules (<300 Da) belonging mainly to lipophilic terpenoids, phenylpropanoids and short-chain aliphatic derivatives. These compounds undergo chemical changes as a result of different chemical reactions such as oxidation, cyclization and dehydrogenation, causing changes in the start material that is affected by the age of the plant, season, soil conditions, weather and location. Essential oils are used in different industrial applications such as food (flavors), perfumes and pharmaceutical preparations, including antiseptics, insect repellents and root canal sealers used in dentistry. Moreover, the antimicrobial activity of essential oils is found in vapor and liquid phases, supporting their use as food protectants or for therapeutic applications.

In an alternative embodiment, as noted above, the additive mixture comprises a fragrance. Fragrances, including volatile compounds that emit pleasant odors, are added into aerosol formulations to impart desirable scents to various consumer products such as air fresheners, body sprays, and deodorants. Examples of the pleasant odors may include floral, fruity, or musky scents used in air fresheners, body sprays, and household cleaners. In another alternative embodiment, the additive mixture comprises a disinfectant. Disinfectants have antimicrobial agents that inhibit harmful microorganisms, providing sanitation and hygiene of surfaces and air spaces. The antimicrobial agents have quaternary ammonium compounds, hydrogen peroxide, or alcohol, for killing or inhibiting the growth of bacteria, viruses, and fungi. Such disinfectant based aerosol solutions find application in household cleaners, sanitizing sprays, and healthcare disinfectants.

In an alternative embodiment, additive mixture comprises a medicinal agent for inhalers. Medicinal agents may include analgesics, antipyretics, and decongestants, which are mixed into aerosol formulations to deliver therapeutic effects through inhalation for treating respiratory ailments or providing relief from discomfort. In yet another alternative embodiment, the additive mixture comprises a corrosion inhibitors to protect the container and valves from rust and corrosion caused by chemical constituents of the aerosol formulation. The corrosion inhibitors can include compounds such as phosphates, amines, or organic acids.

The unique combination of the propellant mixture and the additive mixture contained within an aerosol container offers distinct advantages in functionality, safety, and environmental impact. The propellant mixture, comprising trans-1,3,3,3-Tetrafluoroprop-1-ene (Solstice® 1234ze) and Trans-1-chloro-3,3,3-trifluoropropene (Solstice® 1233zd), provides a non-flammable solution with minimal environmental impact, ensuring safety during storage, transportation, and usage. The controlled proportions of the first and second components allow for versatility in application, and adjust the propellant mixture to specific product requirements. Furthermore, the additive mixture, constituting a significant proportion of the aerosol container's content and exhibiting a specific gravity within a range of 0.5 to 1.2, ensures molecular compatibility with the propellant mixture. This compatibility facilitates uniform dispersion and efficient delivery of the additive components, optimizing product performance and efficacy. Overall, the integration of the propellant mixture and additive mixture in the aerosol container offers a balanced solution that combines safety, environmental responsibility, and operational efficiency, meeting consumer demands while minimizing adverse impacts on health and the environment.

Figure 2A:
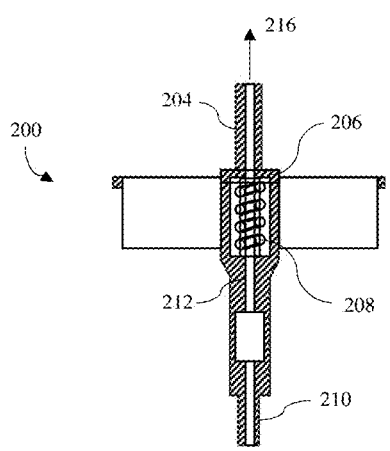
FIG. 2A is a sectional view of an aerosol valve of an aerosol dispenser, according to an exemplary embodiment of the present invention.
Figure 2B:
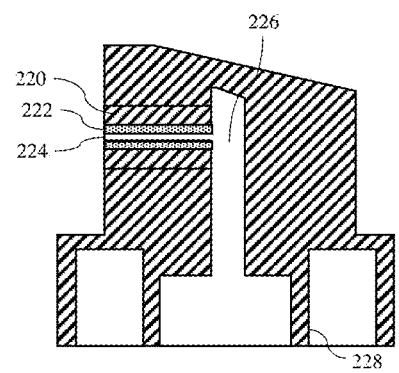
FIG. 2B is a sectional view of an aerosol actuator of an aerosol dispenser; according to an exemplary embodiment of the present invention.

With reference to FIGS. 2A and 2B, the aerosol valve and aerosol actuator are shown, respectively, according to an example embodiment. FIG. 2A shows the aerosol valve 200 in accordance with an embodiment of the present invention. The aerosol valve of the aerosol dispenser regulates the release of the substance contained within the aerosol container and comprises a valve stem 204, sealing gasket 206, a metering chamber 208, a dip tube 210, and a channel supplying liquid to the chamber 212. In an embodiment, the aerosol valve is a metered valve with an aperture having a diameter ranging from 0.15 microns to 300 microns. The valve stem is connected to the actuator that users interact with to release the material. When the actuator is pressed, it depresses the valve stem, initiating the dispensing process where the material moves towards a nozzle of the actuator via the valve stem in the direction 216. The sealing gasket is connected to the valve stem at a lower end of the valve stem. The sealing gasket ensures that the valve remains tightly sealed when not in use. The sealing gasket prevents leakage of the substance and helps maintain the integrity of the dispenser. In various embodiments, the aerosol dispenser has a metering chamber for measuring and controlling the amount of propellant mixture to be dispensed. It is typically a small cavity or chamber within the valve assembly where the propellant mixture is stored before being released.

The insert chip 220 is located at the top of the actuator and is designed to be pressed or triggered by the user to initiate the dispensing process. In various embodiments, the insert chip may be position on top of the nozzle 222, as shown in FIG. 2B. The insert chip provides a tactile interface for user interaction, allowing them to activate the dispenser with ease. The nozzle provides a flow path for the propellant mixture to flow outside of the aerosol dispenser. The nozzle features a nozzle hole 224, also referred to as an actuator orifice, a small aperture through which the propellant mixture is expelled when the actuator is activated. The size and shape of the actuator orifice can influence the characteristics of the dispensed substance, such as the spray pattern and dispersion.

The communication path 226 is a conduit that connects the nozzle to the valve stem, providing a pathway for the substance to flow from the valve to the nozzle. The communication path ensures a continuous and unobstructed flow of the substance, facilitating smooth and consistent dispensing. The fitting portion 228 of the aerosol actuator is designed to be fitted within groves of the aerosol dispenser and securely attach the actuator to the aerosol valve of the dispenser. It forms a tight seal with the valve, preventing leakage and ensuring that the dispensing mechanism operates effectively. The system employs a 0.4 mm actuator, specifically designed to optimize molecular breakup during atomization. This ensures efficient and uniform spray, even with high active material concentrations.

The incorporation of the metered valve within the aerosol dispenser system ensures precise and consistent delivery of the additive mixture with every use. Said valve is configured to dispense a fixed amount of propellant and additive mixture, regardless of the duration or force applied to the actuator by the user. The metered valve achieves this through its aperture, having the diameter ranging from 0.15 microns to 300 microns, which precisely controls the flow of the propellant mixture and additive from the container to the actuator nozzle. This means that each press of the actuator releases an identical volume of propellant and additive, ensuring uniformity in the amount of product dispensed. This feature is particularly crucial in applications where consistency in the volume of the dispensed product is paramount, such as in the delivery of fragrances or medicinal aerosols. By ensuring that each actuation dispenses the same amount of perfume or propellant, the metered valve not only enhances the user experience by providing consistent performance but also optimizes the consumption of the propellant and additive mixtures. This precise control mechanism aligns seamlessly with the system's goal of optimizing additive dispersion by leveraging the specific gravity and propellant compatibility, thereby maintaining the integrity and efficacy of the dispensed product throughout its usage.

As shown, the dip tube extends from the bottom of the aerosol valve into the aerosol container holding the propellant mixture. As noted above, the material of the aerosol container comprises one of a scrap metal, aluminum, plastic, and glass. The dip tube is a conduit, allowing the liquid or propellant mixture to flow from the container into the metering chamber. The dip tube ensures that the valve can access the propellant mixture when the level of propellant mixture in the aerosol container decreases. The channel supplying liquid to the chamber connects the dip tube to the metering chamber, providing a pathway for the propellant mixture to flow into the chamber. This channel ensures a continuous supply of the propellant mixture to the metering chamber, enabling the valve to dispense the substance reliably.

In various embodiments, the aerosol valve 200 is a continuous valve that continuously regulates the flow of fluid, such as the propellant mixture through a pipeline without abrupt interruptions. Specifically, the continuous valve comprises various constructional elements, similar to the aerosol valve 200, to achieve this function. The continuous valve includes a valve body, which serves as the main structure housing the internal components. The valve body is designed to withstand the fluid pressure and environmental conditions. Within the valve body, there is a movable element, often a disc or a plug, which is connected to the valve stem. The valve stem is manipulated by an external actuator, such as a press-button or a lever. The actuator controls the flow of the propellant mixture through the pipeline. For example, a ball valve is a type of continuous valve. Other types of continuous valves may include metering valves, diaphragm valves, precision flow control valves, and needle valves.

The continuous valve is configured to facilitate a consistent and uninterrupted release of the substance within the aerosol container. Unlike its metered counterpart, which dispenses a fixed amount of material with each actuation, the continuous valve allows for a steady flow of the propellant and additive mixture for as long as the actuator is pressed. This valve operates on a principle that ensures a predetermined ratio of propellant to additive is maintained throughout the duration of the dispensing process. The continuous valve achieves this through a carefully designed orifice and flow control mechanism that regulates the pressure and volume of the material being expelled, ensuring a uniform dispersion of the additive in conjunction with the propellant. This consistency is crucial for applications requiring precise control over the application of the aerosol's contents, such as in spray painting or the delivery of medical aerosols, where the uniformity of the spray pattern and the dosage can be critical to the effectiveness of the application as it is dispersed over time. The continuous valve's ability to maintain a constant ratio of propellant to additive over time exemplifies its importance in achieving optimal performance and reliability in the dispensing system.

Figure 3A:
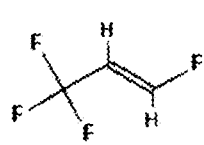
FIG. 3A is a perspective view of the molecular structure of trans-1,3,3,3-Tetrafluoroprop-1-ene, according to an example embodiment.
Figure 3B:
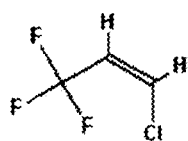
FIG. 3B is a perspective view of the molecular structure of trans-1-chloro-3,3,3-trifluoropropene, according to an example embodiment.
Figure 3C:
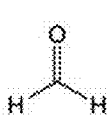
FIG. 3C is a perspective view of the molecular structure of Formaldehyde, according to an example embodiment.
Figure 3D:
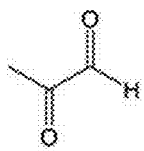
FIG. 3D is a perspective view of the molecular structure of Methylglyoxal, according to an example embodiment.
Figure 3E:
FIG. 3E is a perspective view of the molecular structure of carbon dioxide, according to an example embodiment.
Figure 3F:
FIG. 3F is a perspective view of the molecular structure of dinitrogen, according to an example embodiment.

With reference now to FIGS. 3A through 3B, embodiments of the propellant mixture are described. FIG. 3A shows the first component 300 of the propellant mixture. The first component is trans-1,3,3,3-Tetrafluoroprop-1-ene, abbreviated as HFO-1234ze, is a fluorinated propylene with the chemical formula $C_3H_2F_4$. Such a component is a colorless, odorless gas at room temperature and pressure. The first component belongs to a class of hydrofluoroolefins (HFOs) and is used as a replacement for hydrofluorocarbons (HFCs) and chlorofluorocarbons (CFCs) due to its lower global warming potential (GWP) and ozone depletion potential (ODP). In one embodiment, presence of the first component in proportion ranging between 50% and 99% by volume of a total propellant mixture, reduces the environmental impact of the propellant mixture compared to conventional fluorocarbon or hydrocarbon propellants. The first component has a GWP of less than 1, which means that it has significantly less impact on global warming compared to traditional refrigerants and blowing agents. Further, Trans-1,3,3,3-tetrafluoroprop-1-ene exhibits favorable thermodynamic properties, making it suitable for use in a wide range of applications, including propellant mixtures in aerosol dispensers, refrigeration, air conditioning, and foam insulation.

The second component 302 Trans-1-chloro-3,3,3-trifluoropropene is shown in FIG. 3B. Trans-1-chloro-3,3,3-trifluoropropene is an alternative propellant used in aerosol dispensers. The chemical structure consists of a trans-arranged chloro and trifluoromethyl groups attached to a propene structure. Trans-1-chloro-3,3,3-trifluoropropene also exhibits low global warming potential (GWP) and ozone depletion potential (ODP). Trans-1-chloro-3,3,3-trifluoropropene in a proportion ranging between 1% and 50% by volume of the total propellant mixture provides solvency and dispersal properties, making the second component suitable for a wide range of aerosol applications. Trans-1-chloro-3,3,3-trifluoropropene is also compatible with various substances commonly used in aerosol products, such as Trans-1,3,3,3-tetrafluoroprop-1-ene without compromising stability or of the propellant mixture. The first component and the second component belong to the same chemical family and have similar structural characteristics and are used as alternatives to traditional fluorinated compounds in various applications, including as propellants in aerosol dispensers. Trans-1-chloro-3,3,3-trifluoropropene and trans-1,3,3,3-tetrafluoroprop-1-ene are compatible with each other. The first and second components exhibit solubility and mixing properties for propellant mixtures.

Figure 4A:
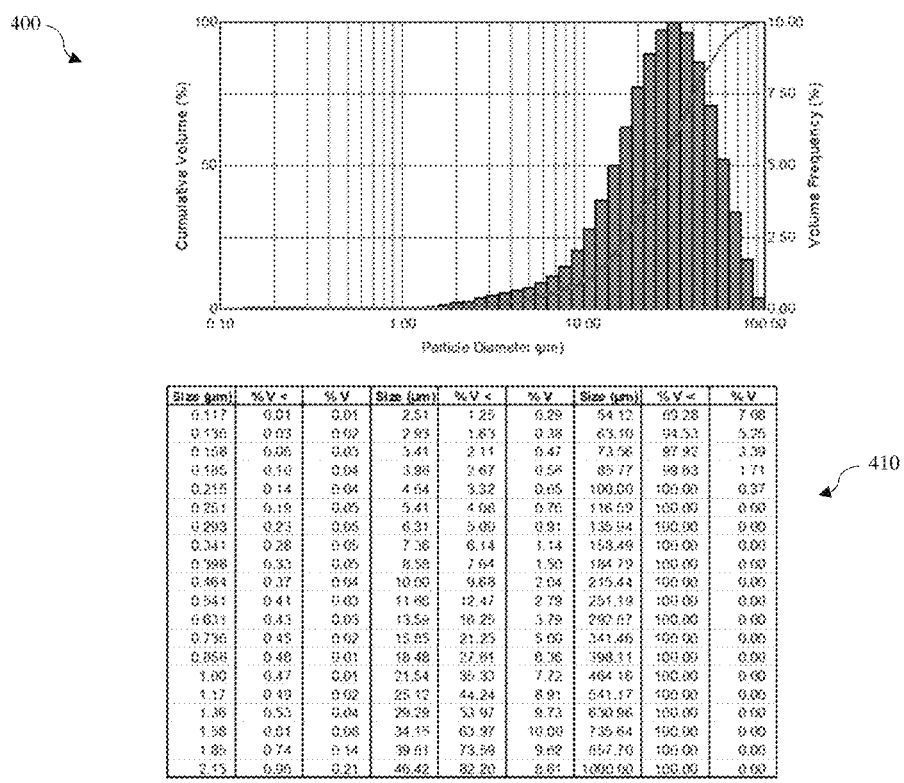
FIGS. 4A, 4B, and 4C illustrate various graphs plotted for particle size distribution of propellant mixtures used in aerosol dispensers of the present invention.
Figure 4B:
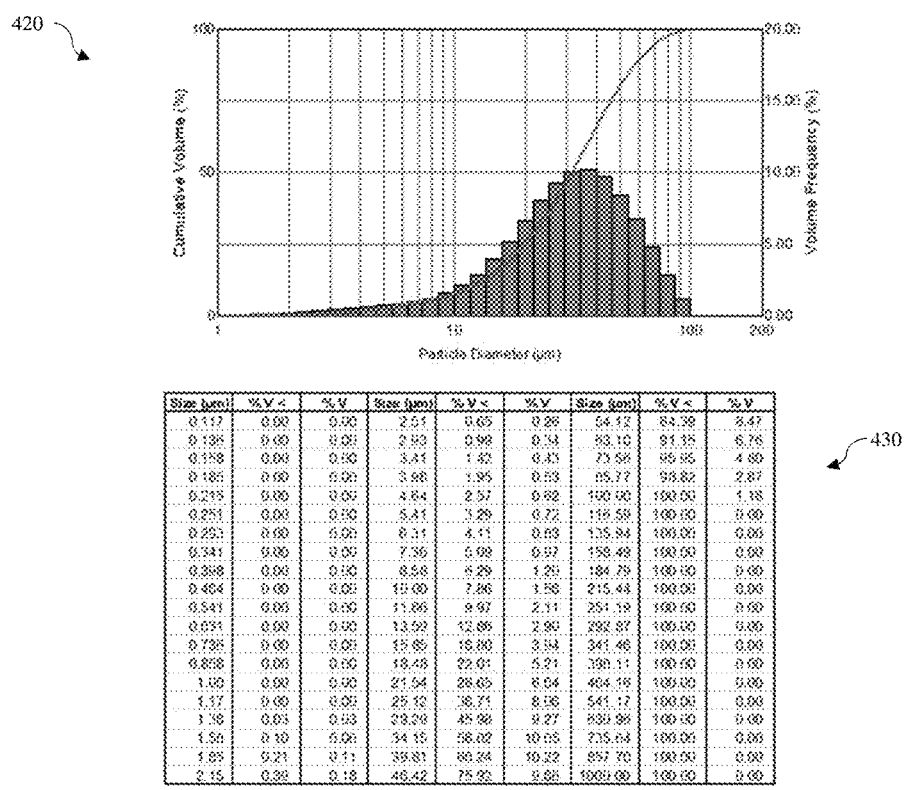
Figure 4C:
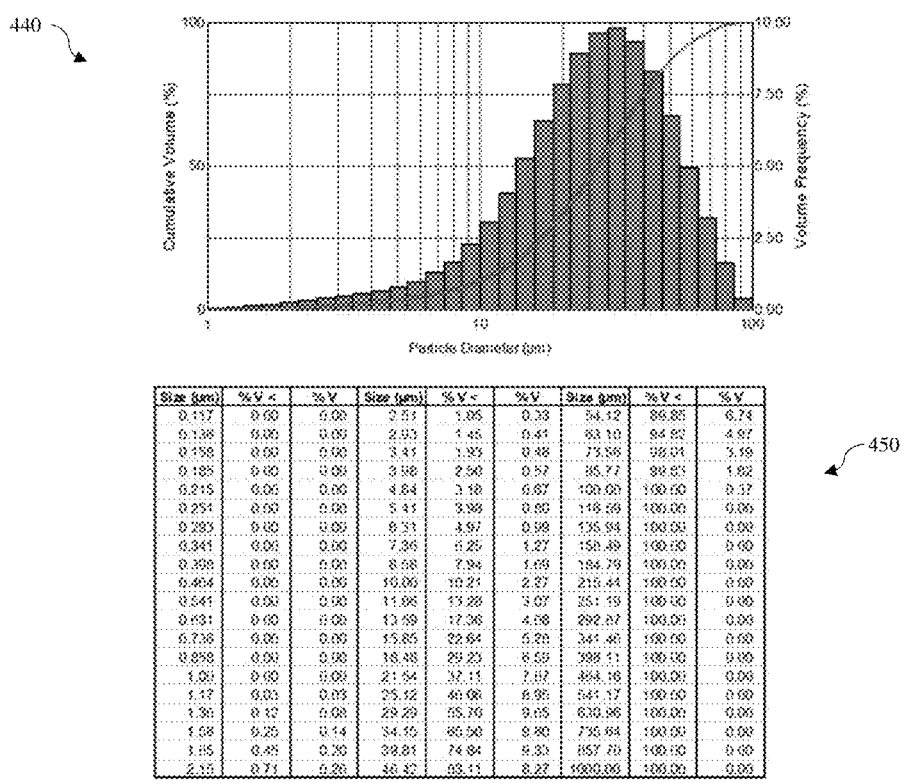

FIGS. 4A, 4B and 4C illustrate various graphs plotted for average particle size distribution of the propellant mixtures of different samples used in aerosol dispensers. The graphs 400, 420 and 440 are plotted based on readings captured in the tables 410, 430 and 450, respectively. For obtaining the readings in the tables, three samples of different aerosol spray products were tested and compared to other products in a first phase. Each aerosol product sample was analyzed for particle size distribution. A Malvern Spraytec laser diffraction particle size analyzer was used to measure the particle size distribution. All aerosol spray and particle size measurements were done at six (6") inches from the spray nozzle. Each sample was actuated a minimum of four (4) times per test and the average taken. This was performed for each of the samples. In a second phase, three separate aerosol spray cans, were individually dispersed into a sealed 16 $m^3$ aerosol containment chamber and monitored for the amount of time the particles of each spray remained airborne in the chamber. The particles in the chamber were monitored throughout each trial by a TSI fast mobility particle sizer (FMPS). The data from these trials was exported to a computer to be normalized and plotted for comparison. The results showed that the spray of the present invention produced a smaller particle size distribution than sprays of other products tested. The spray of the present invention produced more nanoparticles and these nanoparticles persisted in the air longer than the other sprays. As would be understood, greater persistence of nanoparticles results in longer duration of the aroma of the air freshener and less deposition onto surfaces.

The tables 410, 430 and 450 capture the various readings of cumulative volume, particle diameter and volume frequency for particles of propellant mixture. The axes of the graphs correspond to cumulative volume, particle diameter and volume frequency aerosol solution used in the aerosol dispenser. As shown in FIG. 4A, in between the particle diameters 10 μm and 100 μm of a first sample, the cumulative volume (% V) is at a peak value. As shown in the table, when the particle size is greater than 85.77 μm, the cumulative volume is at maximum value of 100%.

FIG. 4B illustrates the graph 420 plotted for the values in the table 430 for a second sample. As shown in the FIG. 4B, when the particle size is 85.77 μm, the value of "% V<" is 98.82 and when the particle size increases to 100 μm, the corresponding value of "% V<" is 100. FIG. 4C shows the graph 440 plotted based on the values in the table 450. As shown in table 450, when the particle size is 85.77 μm, the value of "% V<" is 99.63 and when the particle size increases to 100 μm, the corresponding value of "% V<" becomes 100, as also shown in the graph 440.

The disclosed embodiments provide a combination of an extended lifespan of the spray in the atmosphere, non-flammability, generation of no Volatile Organic Compounds (VOCs), environmental friendliness, and no adverse impact on the ozone layer for an aerosol dispenser. This provides a multifaceted advantage that significantly enhances utility and sustainability of the aerosol dispenser. Firstly, the extended lifespan ensures prolonged functionality and durability, reducing the frequency of replacements and minimizing resource consumption. Secondly, the non-flammability feature enhances safety by mitigating the risk of fire hazards, thereby promoting a secure operating environment. Thirdly, the absence of VOCs not only contributes to improved indoor air quality but also aligns with stringent environmental regulations, providing a healthier living and working environment. Moreover, the environmental friendliness of the dispenser promotes sustainability, reducing the ecological footprint associated with its production, use, and disposal. The absence of adverse impacts on the ozone layer reduces the ill effects on the ozone layer in the longer run. Collectively, these attributes elevate the performance and safety standards of the aerosol dispenser and contribute positively to environmental conservation and human well-being.

Overall, the formulation of this aerosol delivery system produces synergistic effects by optimizing the interactions between the propellant mixture and the additive, resulting in enhanced performance, stability, and dispersion efficiency. The combination of trans-1,3,3,3-tetrafluoroprop-1-ene and trans-1-chloro-3,3,3-trifluoropropene within the specified concentration ranges provides a balanced vapor pressure profile, ensuring consistent atomization while maintaining environmental compliance with low global warming potential (GWP). This propellant mixture effectively solubilizes and disperses the additive, which is present in an amount of up to 70% w/w % of the aerosol. The additive is carefully selected to have a specific gravity between 0.5 and 1.2, ensuring uniform suspension within the propellant mixture, preventing phase separation, and optimizing misting properties.

The molecular compatibility of the additive with the propellant mixture, as defined by its partition coefficient in the range of −0.5 to 4.0, ensures that it remains fully integrated without precipitating or disrupting aerosol stability. The partition coefficient is a measure of how a substance distributes itself between two immiscible phases, typically a non-polar solvent (such as oil) and a polar solvent (such as water). It quantifies the relative solubility of a compound in different environments, indicating whether a substance preferentially dissolves in a polar or non-polar medium. The partition coefficient is often expressed as log P, which represents the logarithm of the ratio of concentrations of the compound in the two phases. A positive log P indicates that the compound is more soluble in the non-polar phase (lipophilic), while a negative log P suggests greater solubility in the polar phase (hydrophilic).

The additive must remain homogeneously dispersed within the aerosol, preventing phase separation, precipitation, or degradation. The defined partition coefficient range of −0.5 to 4.0 ensures that the additive has balanced solubility, meaning it is neither too hydrophilic (which would cause it to separate from the propellant) nor too lipophilic (which could lead to inconsistent dispersion or nozzle clogging). By selecting additives—such as essential oils, alcohols, ketones, esters, and refined terpenic hydrocarbons—that fall within this partition coefficient range, the formulation maintains stability, ensuring fine mist atomization, prolonged airborne suspension, and consistent spray performance.

Additionally, controlling the water content to at most 2% w/w % prevents instability issues such as emulsification failures, excessive droplet coalescence, or nozzle clogging, ensuring smooth and reliable actuation. The synergistic effect of these parameters results in a fine, consistent mist with optimized droplet size, prolonged airborne suspension, and enhanced sensory impact, making the formulation highly effective for applications such as fragrance dispersion, air treatment, and surface treatments. By carefully balancing each component's physical and chemical properties, this formulation achieves superior performance compared to conventional aerosol systems, providing improved efficiency, longer-lasting effects, and greater formulation stability.

This aerosol delivery system improves over the prior art by addressing key limitations in atomization efficiency, formulation stability, environmental impact, and sustained airborne suspension while enhancing the homogeneity and compatibility of the additive within the propellant mixture.

One major advancement is the optimized propellant combination of trans-1,3,3,3-tetrafluoroprop-1-ene and trans-1-chloro-3,3,3-trifluoropropene, which provides a balanced vapor pressure profile that ensures consistent droplet formation and a fine mist dispersion. In prior-art aerosol systems, propellants often create large, non-uniform droplets that settle quickly, reducing the product's effectiveness. By contrast, the controlled vapor pressure in this system allows for smaller, more uniform droplets that remain airborne for extended periods, improving diffusion, fragrance retention, and active ingredient delivery.

Another key improvement is the enhanced molecular compatibility of the additive with the propellant mixture. Prior-art systems frequently suffer from phase separation, precipitation, or incompatibility between the active ingredients and propellant, leading to unstable formulations and inconsistent spray performance. This invention overcomes those issues by selecting an additive with a partition coefficient in the range of −0.5 to 4.0, ensuring that it remains molecularly dispersed within the aerosol without forming sediment, residues, or clogging the actuator nozzle.

Additionally, this system offers greater formulation flexibility by allowing an additive content of up to 70% w/w % while still maintaining phase stability. Many existing aerosols are limited in the amount of active ingredient they can incorporate before destabilizing, whereas this formulation ensures that a high concentration of functional additives, such as essential oils, fragrances, or disinfectants, can be homogeneously mixed within the propellant. This capability significantly enhances the potency and longevity of the aerosol's effects, making it more effective in applications such as environmental scenting, air purification, and topical cooling sprays.

From an environmental perspective, this invention reduces reliance on traditional hydrocarbon-based propellants that contribute to high global warming potential (GWP) emissions. The selected hydrofluoroolefin (HFO) propellants provide a low-GWP alternative while maintaining the necessary thermodynamic properties for effective aerosolization. Furthermore, by limiting the water content of the additive to at most 2% w/w %, this system avoids instability issues common in prior-art formulations that contain excessive moisture, which can lead to phase separation or compromised solubility in hydrofluorocarbon-based systems.

Compared to traditional aerosols, this system ensures longer airborne suspension, improved sensory delivery, reduced environmental impact, and enhanced product stability, making it a superior alternative for modern aerosol applications. To evaluate the performance of the disclosed aerosol delivery system compared to the prior art, a comparative study was conducted by Aerosol Research and Engineering Laboratories, Inc. The study consisted of two primary phases: particle size distribution testing and airborne aerosol retention time testing. These tests assessed the formulation's ability to generate fine mist particles and its effectiveness in maintaining airborne suspension, comparing it against leading competitors. The disclosed aerosol delivery system demonstrated superior performance, achieving smaller particle size distribution and significantly prolonged airborne retention compared to Glade®, Febreze®, and Vitruvi® products.

The first phase of the study analyzed the particle size distribution (PSD) of the disclosed aerosol delivery system and competitor products using a Malvern Spraytec laser diffraction particle size analyzer. The analysis measured key distribution parameters, including D10, D50, D90, and D[4, 3], at a distance of six inches from the spray nozzle. Each sample was actuated at least four times to ensure consistency, and the results were averaged.

The results revealed that the disclosed aerosol delivery system consistently produced smaller particles than the competitor sprays. The volume mean diameter (D[4,3]) of the disclosed aerosol was 31.49 μm, significantly smaller than the competitor products, with Glade® averaging 77.91 μm, Febreze® 75.03 μm, and Vitruvi® 89.77 μm. Additionally, the D50 value (the median particle size) of the disclosed aerosol was 28.49 μm, compared to 69.26 μm for Glade®, 69.72 μm for Febreze®, and 80.64 μm for Vitruvi®. These results indicate that the disclosed aerosol produces a finer mist than conventional air fresheners, which contributes to improved diffusion and prolonged airborne presence.

The second phase of testing measured the airborne retention time of the disclosed aerosol delivery system and competitor products in a sealed 16 m$^3$ test chamber. A TSI Fast Mobility Particle Sizer (FMPS) continuously monitored the chamber's aerosol concentration to assess how long the particles remained suspended. Each product was actuated once in the chamber, and the concentration decay was recorded over a one-hour period.

The results demonstrated that the disclosed aerosol delivery system produced over 10 times more nanoparticles than Glade® and over 100 times more nanoparticles than Febreze® and Vitruvi®. The disclosed aerosol had an initial chamber concentration of 1.62E+05 particles/cm$^3$, significantly exceeding Glade® (6.71E+03 particles/cm$^3$), Febreze® (4.46E+02 particles/cm$^3$), and Vitruvi® (2.93E+02 particles/cm$^3$). Furthermore, the disclosed aerosol exhibited slower degradation, meaning that it remained airborne for a substantially longer duration than the competing formulations.

At the end of the one-hour trial, the disclosed aerosol maintained a higher residual particle concentration than the starting concentration of the next closest competitor, Glade®. The Febreze® and Vitruvi® products exhibited such rapid particle decay that they reached the instrument's noise level within the first 10 minutes, indicating minimal airborne persistence. The ability of the disclosed aerosol to sustain high particle concentrations over time correlates directly to prolonged fragrance diffusion and reduced surface deposition, resulting in an improvement over the prior art for applications requiring long-lasting effects.

The test results confirm that the disclosed aerosol delivery system outperforms the prior art in particle size control and airborne suspension time. By generating a smaller and more uniform particle distribution, the disclosed aerosol optimizes mist diffusion and minimizes excessive droplet fallout. Its ability to produce significantly more nanoparticles and sustain them in the air for extended periods ensures enhanced fragrance longevity, improved sensory perception, and more effective room coverage. These findings demonstrate that the formulation provides a superior user experience by delivering a finer mist that remains airborne longer, reducing waste, and maximizing fragrance efficiency.

The disclosed aerosol delivery system exhibits a natural tendency to disperse upward upon dispensing, in contrast to conventional aerosols such as Febreze® and Glade®, which tend to disperse downward. This upward dispersion is driven by the optimized velocity, fine particle size distribution, and balanced propellant composition. The propellant mixture, consisting of trans-1,3,3,3-tetrafluoroprop-1-ene and trans-1-chloro-3,3,3-trifluoropropene, provides a controlled vapor pressure that enables the formulation to be expelled with higher initial velocity, reducing immediate gravitational settling. Additionally, the aerosol generates microdroplets within the range of 25 to 50 microns, ensuring that the mist remains lighter and more buoyant compared to traditional formulations that produce larger droplets, which are more susceptible to rapid settling. The combination of low viscosity (0.5 to 3.0 cP), fine mist atomization, and optimized airflow dynamics allows the aerosolized particles to experience greater air resistance and diffusion, causing them to suspend longer and disperse more evenly throughout a space. In contrast, conventional aerosol sprays such as Febreze® and Glade® tend to produce larger, denser droplets that fall quickly due to their weight and insufficient initial velocity, leading to localized surface deposition rather than sustained airborne presence. This unique upward dispersion characteristic of the disclosed aerosol delivery system results in longer-lasting fragrance diffusion, improved air treatment coverage, and reduced surface residue, making it significantly more effective for environmental scenting and air purification applications.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. An aerosol delivery system for environmental scenting, the aerosol delivery system comprising:
   an aerosol container comprising an aerosol, the aerosol comprising;
      a propellant mixture contained within the aerosol container, comprising:
         a trans-1,3,3,3-tetrafluoroprop-1-ene propellant present in an amount of 50% to 99% w/w % of the propellant mixture;
         a trans-1-chloro-3,3,3-trifluoropropene propellant present in an amount of 1% to 50% w/w % of the propellant mixture;
      an additive present in an amount of 10% to 40% w/w % of the aerosol;
   a micromist actuator comprising an actuator orifice having an exit diameter ranging from 0.25 microns to 0.80 microns; and
   wherein the aerosol, when dispensed through the micromist actuator, forms droplets having a mean droplet size ranging from 25 microns to 50 microns, as measured by laser diffraction particle size analysis;
   wherein the additive comprises a specific gravity within a range of 0.5 to 1.2;
   wherein the additive is molecularly compatible with the propellant mixture, such that the additive comprises a partition coefficient in the range of −0.5 to 4;
   wherein the additive comprises a water content up to 2% w/w % of the additive.

2. The aerosol delivery system of claim 1, wherein a viscosity of the aerosol is within a range of 0.5 to 3.0 centipoise at room temperature.

3. The aerosol delivery system of claim 2 wherein the propellant mixture further comprises at least one of (i) carbon dioxide present in an amount of up to 30% w/w % of the propellant mixture, and (ii) dinitrogen present in an amount up to 40% w/w % of the propellant mixture.

4. The aerosol delivery system of claim 3 wherein the additive is molecularly compatible with the propellant mixture and remains homogeneously dispersed within the aerosol container, the additive comprising either (i) at least one polar compound selected from the group consisting of alcohols, ketones, and esters; or (ii) at least one non-polar compound selected from the group consisting of refined terpenic hydrocarbons and essential oils.

5. An aerosol delivery system, the aerosol delivery system comprising:
   an aerosol container comprising an aerosol, the aerosol comprising;
      a propellant mixture contained within the aerosol container, comprising:
         a trans-1,3,3,3-tetrafluoroprop-1-ene propellant present in an amount of 50% to 99% w/w % of the propellant mixture;
         a trans-1-chloro-3,3,3-trifluoropropene propellant present in an amount of 1% to 50% w/w % of the propellant mixture;
      an additive present in an amount of up to 70% w/w % of the aerosol;
   wherein the additive comprises a specific gravity within a range of 0.5 to 1.2;
   wherein the additive is molecularly compatible with the propellant mixture, such that the additive comprises a partition coefficient in the range of −0.5 to 4; and
   wherein the additive comprises a water content up to 2% w/w % of the additive.

6. The aerosol delivery system of claim 5, wherein the aerosol produces a topical cooling effect when dispersed such that the additive is an essential oil present in an amount up to 10% w/w % of the aerosol.

7. The aerosol delivery system of claim 5, wherein the additive is an essential oil present in an amount from to 10% to 40% w/w % of the aerosol.

8. The aerosol delivery system of claim 5 wherein the additive is molecularly compatible with the propellant mixture and remains homogeneously dispersed within the aerosol container, the additive comprising either (i) at least one polar compound selected from the group consisting of alcohols, ketones, and esters; or (ii) at least one non-polar compound selected from the group consisting of refined terpenic hydrocarbons and essential oils.

* * * * *